(12) United States Patent
Oh et al.

(10) Patent No.: US 11,184,120 B2
(45) Date of Patent: Nov. 23, 2021

(54) METHOD AND DEVICE FOR OPERATING PLURALITY OF TRANSMISSION TIME INTERVALS IN WIRELESS COMMUNICATION SYSTEM

(71) Applicant: Samsung Electronics Co., Ltd., Gyeonggi-do (KR)

(72) Inventors: Jinyoung Oh, Seoul (KR); Jeongho Yeo, Gyeonggi-do (KR); Sungjin Park, Incheon (KR)

(73) Assignee: Samsung Electronics Co., Ltd

( * ) Notice: Subject to any disclaimer, the term of this patent is extended or adjusted under 35 U.S.C. 154(b) by 152 days.

(21) Appl. No.: 16/325,126

(22) PCT Filed: Aug. 11, 2017

(86) PCT No.: PCT/KR2017/008803
§ 371 (c)(1),
(2) Date: Feb. 12, 2019

(87) PCT Pub. No.: WO2018/030865
PCT Pub. Date: Feb. 15, 2018

(65) Prior Publication Data
US 2020/0389262 A1 Dec. 10, 2020

(30) Foreign Application Priority Data

Aug. 12, 2016 (KR) .................. 10-2016-0102685
May 4, 2017 (KR) .................. 10-2017-0057048

(51) Int. Cl.
*H04W 4/00* (2018.01)
*H04L 1/18* (2006.01)
(Continued)

(52) U.S. Cl.
CPC .......... *H04L 1/1854* (2013.01); *H04L 1/1812* (2013.01); *H04L 5/0007* (2013.01);
(Continued)

(58) Field of Classification Search
None
See application file for complete search history.

(56) References Cited

U.S. PATENT DOCUMENTS

| 2004/0042492 A1 | 3/2004 | Suzuki et al. |
| 2009/0245190 A1 | 10/2009 | Higuchi et al. |

(Continued)

FOREIGN PATENT DOCUMENTS

| KR | 1020030017401 | 3/2003 |
| KR | 1020090045239 | 5/2009 |

(Continued)

OTHER PUBLICATIONS

PCT/ISA/210 Search Report issued on PCT/KR2017/008803 (pp. 5).

(Continued)

*Primary Examiner* — Clemence S Han
(74) *Attorney, Agent, or Firm* — The Farrell Law Firm, P.C.

(57) ABSTRACT

Disclosed are a communication technique of merging, with IoT technology, a 5G communication system for supporting a data transmission rate higher than that of a 4G system, and a system therefor. The disclosure can be applied to intelligent services (for example, smart home, smart building, smart city, smart car or connected car, health care, digital education, retail, security and safety related services, and the like) on the basis of 5G communication technology and IoT related technology. The present invention relates to a wireless communication system, and to a method and a device for smoothly providing a service in a communication system. More specifically, the present invention relates to a method and a device for allocating power between heterogeneous services within a communication system. To this end, the method of a terminal, of the present invention comprises the steps of receiving configuration information (Continued)

on different transmission time intervals (TTIs) from a base station; receiving an uplink transmission configuration using the different TTIs from the base station; and allocating power on the basis of the length of the TTIs and whether control information is transmitted.

16 Claims, 21 Drawing Sheets

(51) Int. Cl.
  *H04W 76/27* (2018.01)
  *H04L 5/00* (2006.01)
  *H04W 72/04* (2009.01)
  *H04W 72/12* (2009.01)

(52) U.S. Cl.
  CPC ....... *H04L 5/0055* (2013.01); *H04W 72/0446* (2013.01); *H04W 72/1289* (2013.01); *H04W 76/27* (2018.02)

(56) References Cited

U.S. PATENT DOCUMENTS

| | | | |
|---|---|---|---|
| 2011/0141959 | A1 | 6/2011 | Damnjanovic et al. |
| 2016/0128045 | A1 | 5/2016 | Azarian Yazdi et al. |
| 2016/0262101 | A1 | 9/2016 | Nammi et al. |
| 2017/0265166 | A1* | 9/2017 | Hosseini ............... H04W 24/08 |
| 2017/0338988 | A1* | 11/2017 | Yin ....................... H04L 5/0082 |
| 2018/0048451 | A1* | 2/2018 | Yin ........................ H04L 1/1861 |
| 2018/0242347 | A1* | 8/2018 | Sahlin ............... H04W 72/0446 |
| 2018/0359745 | A1 | 12/2018 | Yeo et al. |
| 2019/0021072 | A1* | 1/2019 | Horiuchi ........... H04W 72/0446 |
| 2019/0132837 | A1* | 5/2019 | Yi ..................... H04W 72/0446 |
| 2019/0215856 | A9* | 7/2019 | Nory ..................... H04L 1/1893 |

FOREIGN PATENT DOCUMENTS

| | | |
|---|---|---|
| WO | WO 2015/139795 | 9/2015 |
| WO | WO 2016/159730 | 10/2016 |

OTHER PUBLICATIONS

PCT/ISA/237 Written Opinion issued on PCT/KR2017/008803 (pp. 5).
Interdigital 3GPP TSG RAN WG1 Meeting #85, Nanjing, China May 23-27, 2016, R1-165052, May 13, 2016, Consideration on sPUSCH Design, pp. 5.
Nokia 3GPP TSG RAN WG1 Meeting #85, Nanjing, P.R. China May 23-27, 2016, R1-164923, May 13, 2016, Simultaneous Transmissions of UL Signals for Shortened TTI Operation, pp. 7.
ZTE, "Downlink Control Channels for Shortened TTI", R1-162405, 3GPP TSG RAN WG1 Meeting #84bis, Apr. 11-15, 2016, 7 pages.
Korean Office Action dated May 23, 2021 issued in counterpart application No. 10-2017-0057048, 9 pages.

* cited by examiner

METHOD AND DEVICE FOR OPERATING PLURALITY OF TRANSMISSION TIME INTERVALS IN WIRELESS COMMUNICATION SYSTEM

PRIORITY

This application is a National Phase Entry of PCT International Application No. PCT/KR2017/008803 which was filed on Aug. 11, 2017, and claims priority to Korean Patent Application Nos. 10-2016-0102685 and 10-2017-0057048, which were filed on Aug. 12, 2016 and May 4, 2017, respectively, the content of each of which is incorporated herein by reference.

TECHNICAL FIELD

The disclosure relates to a wireless communication system, and relates to a method and a device for smoothly providing a service in a communication system. More particularly, the disclosure relates to a method and a device for allocating power between heterogeneous services in a communication system.

Further, the disclosure relates to a wireless communication system, and more particularly, to a method and a device for transmission and reception at a transmission time interval having a length shorter than 1 ms of an LTE system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In the current LTE/LTE-A system, a base station and a terminal are designed to perform transmission and reception in the unit of a subframe in which a transmission time interval is 1 ms. In an environment where a base station and a terminal, which operate at a transmission time interval of 1 ms, exist, in order to support a shortened-TTI terminal operating at a transmission time interval that is shorter than 1 ms, it is necessary to define transmission and reception operations that are discriminated from those of a general LTE/LTE-A terminal.

DISCLOSURE OF INVENTION

Technical Problem

The disclosure has been made in order to solve the above-described problems, and an aspect of the disclosure provides a method and a device for simultaneously providing different types of services. An aspect of the disclosure provides a method and a device capable of efficiently providing different types of services in the same time period by acquiring information matching features of different types of services when the different types of services are simultaneously provided.

Further, one important basis for the performance of a cellular wireless communication system is packet data latency. For this, in an LTE system, signal transmission/reception is performed in the unit of a subframe having a transmission time interval (TTI) of 1 ms. The LTE system operating as described above can support a terminal having a transmission time interval that is shorter than 1 ms (i.e., shortened-TTI/shorter-TTI UE). The shortened-TTI terminal is expected to be suitable to a voice over LTE (VoLTE) service in which latency is important and a remote control service. Further, the shortened-TTI terminal is expected as a means capable of realizing cellular-based mission-critical Internet of things (IoT).

In the current LTE/LTE-A system, the base station and the terminal are designed to perform signal transmission and reception in the unit of a subframe in which the transmission time interval is 1 ms. In an environment where the base station and the terminal, which operate at the transmission time interval of 1 ms, exist, in order to support a shortened-TTI terminal operating at the transmission time interval that is shorter than 1 ms, it is necessary to define transmission and reception operations that are discriminated from those of the general LTE/LTE-A terminal. Accordingly, the disclosure proposes a detailed method for operating both the general LTE/LTE-A terminal and the shortened-TTI terminal in the same system.

In the disclosure, it is considered to use 2 OFDM symbols and 7 OFDM symbols (slots) as TTIs in a downlink, and to use 2 OFDM symbols, 4 OFDM symbols, and 7 OFDM symbols (slots) as TTIs in an uplink, and a method is provided, in which the TTI having a length that is shorter than 1 ms is used in the downlink and the uplink.

Solution to Problem

In accordance with an aspect of the disclosure to solve the above-described problems, a method by a terminal includes receiving, from a base station, configuration information for different transmission time intervals (TTIs); receiving, from the base station, uplink transmission configuration using the different TTIs; and allocating a power based on whether TTI lengths and control information are transmitted. Further, in accordance with another aspect of the disclosure to solve the above-described problems, a terminal includes a transceiver configured to transmit and receive signals; and a controller configured to receive, from a base station, configuration information for different transmission time intervals (TTIs), receive, from the base station, uplink transmission configuration using the different TTIs, and allocate a power based on whether TTI lengths and control information are transmitted.

Advantageous Effects of Invention

According to the aspects of the disclosure, data can be effectively transmitted using different types of services in a communication system. Further, according to the aspects of the disclosure, a method for coexistence of data transmission between heterogeneous services is provided, and thus it is possible to satisfy requirements for the respective services, to reduce transmission time delay, or to efficiently use at least one of frequency-time and spatial resources and transmission power.

Further, according to the aspects of the disclosure, a method for transmitting and receiving signals is provided for transmission and reception by a terminal and a base station, and thus it is possible to reduce transmission time delay.

MODE FOR THE INVENTION

Figure 1:
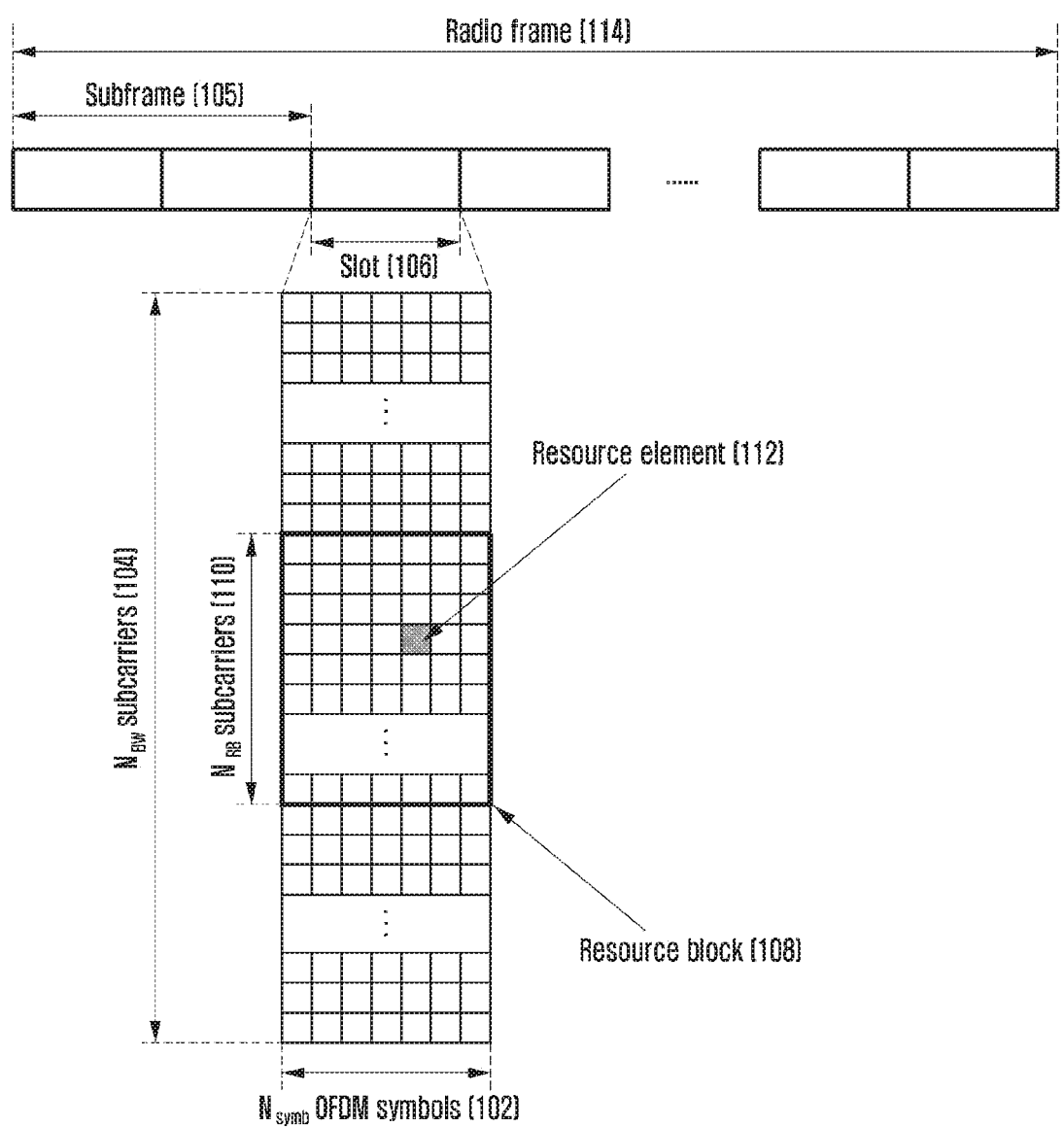
FIG. 1 is a diagram illustrating the basic structure of a time-frequency domain that is a radio resource region in which data or a control channel is transmitted on a downlink in an LTE system or a system similar to the LTE system.

Hereinafter, exemplary embodiments of the disclosure will be described in detail with reference to the accompanying drawings. In describing the disclosure, a detailed description of related known functions or configurations will be omitted if it is determined that it obscures the disclosure in unnecessary detail. Further, all terms used in the description are general terms that are widely used in consideration of their functions in the disclosure, but may differ depending on intentions of a person skilled in the art to which the disclosure belongs, customs, or appearance of new technology. Accordingly, they should be defined based on the contents of the whole description of the disclosure.

The aspects and features of the disclosure and methods for achieving the aspects and features will be apparent by referring to the embodiments to be described in detail with reference to the accompanying drawings. However, the disclosure is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the disclosure, and the disclosure is only defined within the scope of the appended claims. In the entire description of the disclosure, the same drawing reference numerals are used for the same elements across various figures.

The aspects and features of the disclosure and methods for achieving the aspects and features will be apparent by referring to the embodiments to be described in detail with reference to the accompanying drawings. However, the disclosure is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the disclosure, and the disclosure is only defined within the scope of the appended claims. In the entire description of the disclosure, the same drawing reference numerals are used for the same elements across various figures.

In this case, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In this case, the term "unit", as used in an embodiment, means, but is not limited to, a software or hardware component, such as FPGA or ASIC, which performs certain tasks. However, "unit" does not mean to be limited to software or hardware. The term "unit" may advantageously be configured to reside on the addressable storage medium and configured to execute on one or more processors. Thus, "unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "units" may be combined into fewer components and "units" or further separated into additional components and "units". Further, the components and "units" may be implemented to operate one or more CPUs in a device or a security multimedia card. Further, in an embodiment, "unit" may include one or more processors.

A wireless communication system was initially developed for the purpose of providing a voice-oriented service, but has been expanded to, for example, a broadband wireless communication system that provides a high-speed and high-quality packet data service like communication standards, such as 3GPP high speed packet access (HSPA), long term evolution (LTE) or evolved universal terrestrial radio access (E-UTRA), LTE-Advanced (LTE-A), 3GPP2 high rate packet data (HRPD), ultra-mobile broadband (UMB), and IEEE 802.16e. Further, as the 5th generation wireless communication system, 5G or new radio (NR) communication standards have been made.

In the wireless communication system including the 5th generation as described above, at least one service of enhanced mobile broadband (eMBB), massive machine type communications (mMTC), and ultra-reliable and low-latency communications (URLLC) may be provided to a terminal. In this case, the above-described services may be provided to the same terminal during the same time period. In all embodiments of the disclosure described hereinafter, eMBB may take aim at high-speed transmission of high-capacity data, mMTC may take aim at minimization of a terminal power and connection among plural terminals, and URLLC may take aim at high reliability and low delay, but are not limited thereto. Further, in all embodiments of the disclosure described hereinafter, it may be assumed that URLLC service transmission time is shorter than eMBB and mMTC service transmission time, but is not limited thereto. The three types of services as described above may be primary scenarios in an LTE system or post-LTE 5G/new radio or next radio (NR) systems. In an embodiment of the disclosure, a coexistence method between eMBB and URLLC or between mMTC and URLLC, and an apparatus using the method will be described.

It is assumed that a base station schedules a terminal to receive data or control information corresponding to an eMBB service at a specific transmission time interval (hereinafter, TTI). In this case, if a situation occurs, in which the base station should transmit URLLC data or control information at the TTI, the base station may not transmit a part of the eMBB data in at least one of frequency and time domains in which the eMBB data is scheduled to be transmitted, but may transmit the generated URLLC data in the domain in which the part of the eMBB data is not transmitted. In this case, the eMBB-scheduled terminal and the URLLC-scheduled terminal may be the same terminal or different terminals.

It is assumed that the terminal is configured or scheduled by the base station to transmit data or control information corresponding to the eMBB service at the specific TTI. In this case, if a situation occurs, in which the terminal should transmit the URLLC data or control information to the base station or another terminal at the transmission-configured TTI, the terminal may not transmit a part or the whole of the configured eMBB data or control information, but may transmit the generated eMBB data or control information using the whole or a part of the domain in which the eMBB transmission is configured. In this case, the cell in which the eMBB data transmission is scheduled and the cell in which the URLLC data or control information is transmitted may be the same cell or different cells.

In this case, although the terminal has allocated the power that the terminal can use at the corresponding time to the uplink transmission configured from the base station in accordance with the configured uplink transmission, a situation may occur, in which the URLLC data or control information should be transmitted. Accordingly, it may be necessary for the terminal to control or change the configured uplink transmission power in consideration of the URLLC transmission.

Accordingly, in the disclosure, a method will be described, which can configure the transmission power in accordance with at least one of services and the type of information intended to be transmitted if information according to the eMBB and the URLLC is scheduled in a part or the whole of the frequency or time domain, if information according to the mMTC and the URLLC is simultaneously scheduled, if information according to the mMTC and the eMBB is simultaneously scheduled, or if information according to the eMBB, the URLLC, and the mMTC is simultaneously scheduled.

Hereinafter, exemplary embodiments of the disclosure will be described in detail with reference to the accompanying drawings. In describing the disclosure, a detailed description of related functions or configurations will be omitted if it is determined that it obscures the disclosure in unnecessary detail. Further, all terms used in the description are general terms that are widely used in consideration of their functions in the disclosure, but may differ depending on intentions of a person skilled in the art to which the disclosure belongs, customs, or appearance of new technology. Accordingly, they should be defined on the basis of the contents of the whole description of the disclosure. Hereinafter, the base station is the subject that configures a part or the whole control information of the terminal and performs resource allocation, and may be at least one of an eNode B, Node B, base station (BS), radio connection unit, base station controller, transmission and reception point (TRP), and node on a network. The terminal may include user equipment (UE), mobile station (MS), cellular phone, smart phone, computer, or a multimedia system that can perform a communication function.

In the disclosure, a downlink (DL) is a radio transmission path of a signal that is transmitted from the base station to the terminal, and an uplink (UL) means a radio transmission path of a signal that is transmitted from the terminal to the base station. Hereinafter, although an embodiment of the disclosure is described in a state where an LTE or LTE-A system is exemplified, it is also possible to apply the embodiment of the disclosure even to other communication systems having similar technical backgrounds or channel types. For example, the 5th generation mobile communication technology (5G, new radio, or NR) that is developed after LTE-A may be included therein. Further, the embodiment of the disclosure may also be applied to other communication systems through partial modifications thereof in a range that does not greatly deviate from the scope of the disclosure by the judgment of those skilled in the art.

In the LTE system that is a representative example of the broadband wireless communication systems, the downlink (DL) adopts an orthogonal frequency division multiplexing (OFDM) scheme, and the uplink (UL) adopts a single carrier frequency division multiple access (SC-FDMA) scheme. The uplink means a radio link in which a terminal (or user equipment (UE)) or a mobile station (MS) transmits data or a control signal to a base station (BS) (or eNode B), and the downlink means a radio link in which the base station transmits data or a control signal to the terminal. According to the above-described multiple access schemes, data of respective users or control information can be discriminated from each other by performing an allocation and an operation so as to prevent time-frequency resources for carrying the data or control information for each user from overlapping each other, that is, to establish orthogonality.

The LTE system adopts a hybrid automatic repeat request (HARQ) scheme in which a physical layer retransmits the corresponding data if decoding failure occurs during initial data transmission. According to the HARQ scheme, a receiver may transmit information (negative acknowledgement (NACK)) for notifying a transmitter of the decoding failure if the receiver is unable to accurately decode the data, and the transmitter may make the physical layer retransmit the corresponding data. The receiver may combine the data that is retransmitted from the transmitter with the previous data of which the decoding has failed to heighten the data reception performance. Further, if the receiver has accurately decoded the data, the receiver may transmit information (acknowledgement (ACK)) for notifying the transmitter of decoding success, and the transmitter can transmit new data.

First Embodiment

FIG. 1 is a diagram illustrating the basic structure of a time-frequency domain that is a radio resource region in which data or a control channel is transmitted on a downlink in an LTE system or a system similar to the LTE system.

Referring to FIG. 1, a horizontal axis represents a time domain, and a vertical axis represents a frequency domain. In the time domain, the minimum transmission unit is an OFDM symbol, and $N_{symb}$ OFDM symbols 102 constitute one slot 106, and two slots constitute one subframe 105. The length of the slot is 0.5 ms, and the length of the subframe is 1.0 ms. Further, a radio frame 114 is a time domain region that is composed of 10 subframes. In the frequency domain, the minimum transmission unit is a subcarrier, and the transmission bandwidth of the whole system is composed of $N_{BW}$ subcarriers 104 in total. However, such numerical values may be variably applied.

In the time-frequency domain, the basic unit of resources is a resource element (RE) 112 that may be expressed by an OFDM symbol index and a subcarrier index. A resource block (RB) (or physical resource block (PRB)) 108 may be defined by $N_{symb}$ successive OFDM symbols 102 in the time domain and $N_{RB}$ successive subcarriers 110 in the frequency domain. Accordingly, in one slot, one RB 108 may include $N_{symb} \times N_{RB}$ REs 112. In general, the minimum allocation unit of the frequency domain of data is the RB.

In the LTE system, it is general that $N_{symb}$7, $N_{RB}$=12, and $N_{BW}$ and $N_{RB}$ may be in proportion to the bandwidth of the system transmission band. The data rate is increased in proportion to the number of RBs that are scheduled to the terminal. The LTE system may define and operate 6 transmission bandwidths. In case of an FDD system that operates to discriminate a downlink and an uplink from each other by means of frequency, the downlink transmission bandwidth and the uplink transmission bandwidth may differ from each other. A channel bandwidth represents an RF bandwidth corresponding to the system transmission bandwidth. Table 1 below presents the corresponding relationship between the system transmission bandwidth defined by the LTE system and the channel bandwidth. For example, the LTE system having 10 MHz channel bandwidth may have the transmission bandwidth that is composed of 50 RBs.

TABLE 1

| | Channel bandwidth $BW_{channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

Downlink control information may be transmitted within initial N OFDM symbols in the subframe. In general, N may be N={1, 2, 3}. Accordingly, in accordance with the amount of the control information to be transmitted to the current subframe, the N value may be variably applied to each subframe.

The control information being transmitted may include a control channel transmission period indicator indicating how many OFDM symbols the control information is transmitted through, scheduling information on downlink data or uplink data, and information on HARQ ACK/NACK.

In the LTE system, the scheduling information on the downlink data or the uplink data is transferred from the base station to the terminal through downlink control information (DCI). The DCI may be defined in accordance with various formats, and may indicate whether the DCI is scheduling information on the uplink data (UL grant) or scheduling information on the downlink data (DL grant) according to the respective formats, whether the DCI is a compact DCI having a small size of the control information, whether spatial multiplexing using multiple antennas is applied, and whether the DCI is a DCI for power control. For example, DCI format 1 that is the scheduling control information on the downlink data (DL grant) may include at least one of the following control information.

Resource allocation type 0/1 flag: This indicates whether a resource allocation scheme is of type 0 or type 1. If the resource allocation type is type 0, the base station allocates resources in the unit of resource block group (RBG) by applying a bitmap scheme. In the LTE system, the basic unit of scheduling is an RB that is expressed as a time and frequency domain resource, and the RBG is composed of a plurality of RBs, and becomes the basic unit of scheduling in the type 0 scheme.

On the other hand, if the resource allocation type of type 1, the base station allocates a specific RB in the RBG.

Resource block assignment: This indicates an RB allocated for data transmission. An expressed resource is determined in accordance with the system bandwidth and the resource allocation scheme.

Modulation and coding scheme (MCS): This indicates a modulation scheme used for data transmission and the size of a transport block (TB) that is data to be transmitted.

HARQ process number: This indicates a process number of an HARQ.

New data indicator: This indicates whether an HARQ is initially transmitted or retransmitted.

Redundancy version: This indicates a redundancy version of an HARQ.

Transmission power control (TCP) command for a physical uplink control channel (PUCCH): This indicates a transmission power control command for a PUCCH that is an uplink control channel.

The DCI may pass through a channel coding and modulation process, and may be transmitted on a physical downlink control channel (PUCCH) that is a downlink physical control channel (or control information, hereinafter they are mixedly used) or an enhanced PDCCH (EPDCCH) (or enhanced control information, hereinafter they are mixedly used).

In general, the DCI is scrambled with a specific radio network temporary identifier (RNTI) (or terminal identifier), independently with respect to each terminal, is added with a cyclic redundancy check (CRC), is channel-coded, and then is configured and transmitted on each independent PDCCH. In the time domain, the PDCCH is mapped and transmitted during the control channel transmission period. The frequency domain mapping location of the PDCCH may be determined by an Identifier (ID) of each terminal, and may be spread to the whole system transmission band to be transmitted.

The downlink data may be transmitted on a physical downlink shared channel (PDSCH) that is a physical channel for transmitting the downlink data. The PDSCH may be transmitted after the control channel transmission period, and scheduling information, such as a detailed mapping location in the frequency domain and the modulation scheme, is determined based on the DCI being transmitted through the PDCCH.

Through an MCS in the control information constituting the DCI, the base station notifies the terminal of the modulation scheme that is applied to the PDSCH to be transmitted and the transport block size (TBS) of the data to be transmitted. In an embodiment, the MCS may be composed of 5 bits or more or less. The TBS corresponds to the size before channel coding for error correction is applied to the data transport block (TB) intended to be transmitted by the base station.

The modulation scheme supported by the LTE system may be quadrature phase shift keying (QPSK), 16 quadrature amplitude modulation (16QAM), and 64 QAM, and respective modulation orders Qm correspond to 2, 4, and 6. That is, in case of QPSK modulation, 2 bits per symbol may be transmitted, and in case of 16 QAM, 4 bits per symbol may be transmitted. Further, in case of 64 QAM, 6 bits per symbol may be transmitted. Further, in accordance with the system modification, the modulation scheme of 256 QAM or more may be used.

Figure 2:
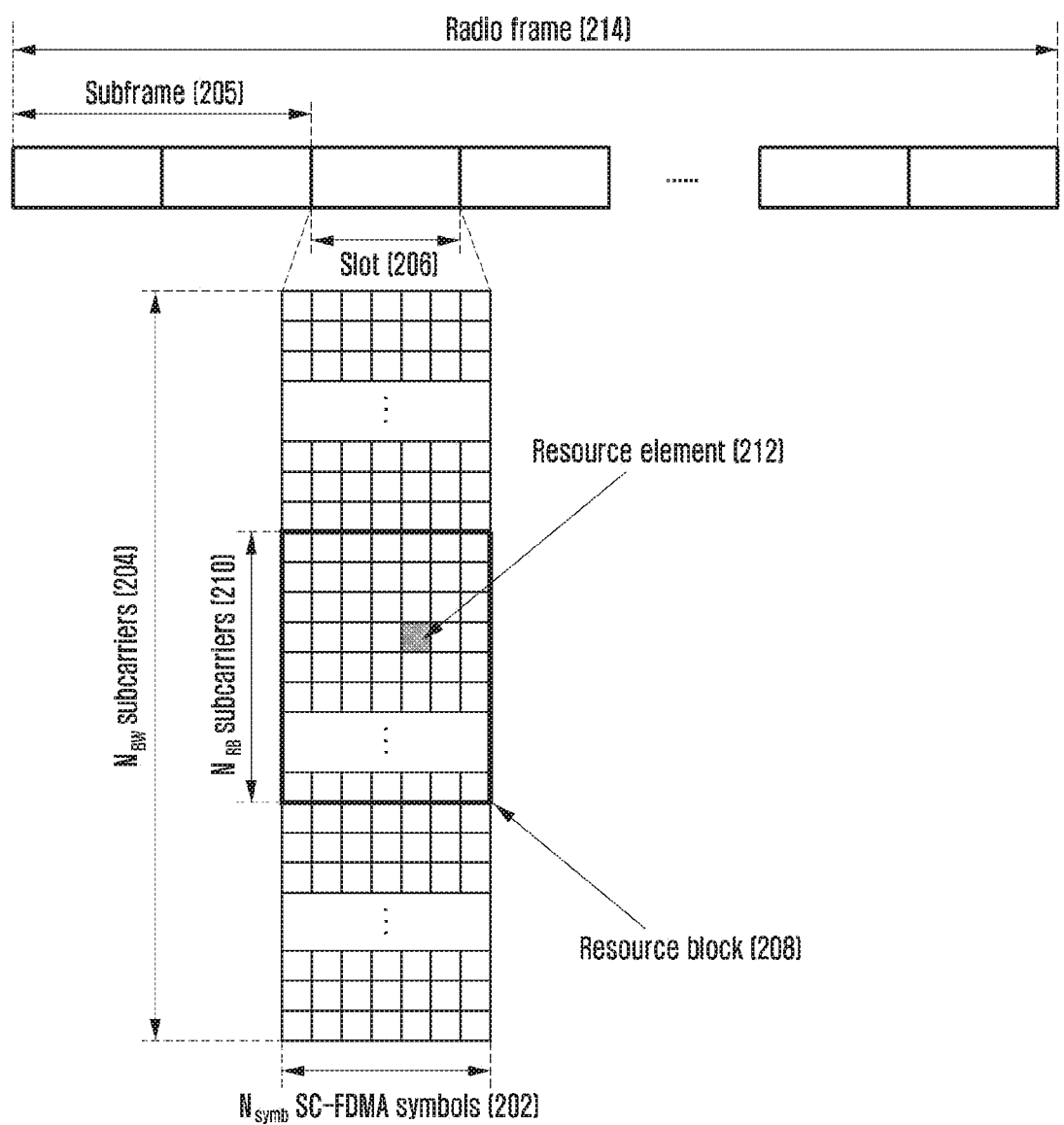
FIG. 2 is a diagram illustrating the basic structure of a time-frequency domain that is a radio resource region in which data or a control channel is transmitted on an uplink in an LTE-A system.

FIG. 2 is a diagram illustrating the basic structure of a time-frequency domain that is a radio resource region in which data or a control channel is transmitted on an uplink in an LTE-A system.

Referring to FIG. 2, a horizontal axis represents a time domain, and a vertical axis represents a frequency domain.

In the time domain, the minimum transmission unit is an SC-FDMA symbol 202, and $N_{symb}$ SC-FDMA symbols may constitute one slot 206. Further, two slots constitute one subframe 205. In the frequency domain, the minimum transmission unit is a subcarrier, and the transmission bandwidth 204 of the whole system is composed of $N_{BW}$ subcarriers in total. $N_{BW}$ may have a value that is in proportion to the system transmission bandwidth.

In the time-frequency domain, the basic unit of resources is a resource element (RE) 212 that may be defined by an SC-FDMA symbol index and a subcarrier index. A resource block pair (RB pair) 208 may be defined by $N_{symb}$ successive SC-FDMA symbols in the time domain and $N_{RB}$ successive subcarriers in the frequency domain. Accordingly, one RB may be composed of $N_{symb} \times N_{RB}$ REs. In general, the minimum transmission unit of data or control information is an RB unit. The PUCCH is mapped to the frequency domain corresponding to 1 RB, and is transmitted for one subframe.

In the LTE system, the timing relationship may be defined between a PDSCH that is an uplink physical channel on which for transmitting downlink data and a PUCCH or PUSCH that is an uplink physical channel on which HARQ ACK/NACK corresponding to PDCCH/EPDDCH including a semi-persistent scheduling release (SPS release) is transmitted. As an example, In the LTE system that operates as a frequency division duplex (FDD), the PDSCH that is transmitted in the (n−4)-th subframe or the HARQ ACK/NACK corresponding to the PDCCH/EPDCCH including the SPS release may be transmitted to the PUCCH or PUSCH in the n-th subframe.

In the LTE system, the downlink HARQ adopts an asynchronous HARQ scheme in which a data retransmission time is not fixed. That is, if the base station receives a feedback of the HARQ NACK from the terminal with respect to initial transmission data transmitted by the base station, the base station freely determines the transmission time of the retransmission data by a scheduling operation. The terminal may perform buffering of data that is determined as an error as the result of decoding the received data for the HARQ operation, and then perform combining of the error data with next retransmission data.

If the PDSCH that includes the downlink data transmitted from the base station in subframe n is received, the terminal transmits the uplink control information including HARQ ACK or NACK of the downlink data in subframe n+k to the base station through the PUCCH or PUSCH. In this case, "k" may be differently defined in accordance with the FDD or time division duplex (TDD) of the LTE system and the subframe configuration. As an example, in case of an FDD LTE system, "k" is fixed to "4". On the other hand, in case of a TDD LTE system, "k" may be changed in accordance with the subframe configuration and the subframe number. Further, during data transmission through a plurality of carriers, the k value may be differently applied in accordance with the TDD configuration of each carrier.

In the LTE system, unlike the downlink HARQ, the uplink HARQ adopts a synchronous HARQ scheme in which the data transmission time is fixed. That is, the uplink/downlink timing relationship among a physical uplink shared channel (PUSCH) that is a physical channel for transmitting uplink data, a PDCCH that is a preceding downlink control channel, and a physical hybrid indicator channel (PHICH) that is a physical channel on which a downlink HARQ ACK/NACK corresponding to the PUSCH is transmitted may be transmitted or received in accordance with the following rules.

If the terminal receives the PDCCH including uplink scheduling control information that is transmitted from the base station in subframe n or the PHICH on which the downlink HARQ ACK/NACK is transmitted, the terminal transmits uplink data corresponding to the control information on the PUSCH in subframe n+k. In this case, "k" may be differently defined in accordance with the FDD or time division duplex (TDD) of the LTE system and the configuration thereof. As an example, in case of the FDD LTE system, "k" may be fixed to "4". On the other hand, in case of the TDD LTE system, "k" may be changed in accordance with the subframe configuration and the subframe number. Further, during data transmission through a plurality of carriers, the k value may be differently applied in accordance with the TDD configuration of each carrier.

Further, if the terminal receives the PHICH including information related to the downlink HARQ ACK/NACK from the base station in subframe i, the PHICH corresponds to the PUSCH transmitted by the terminal in subframe i+k. In this case, "k" may be differently defined in accordance with the FDD or TDD of the LTE system and the configuration thereof. As an example, in case of the FDD LTE system, "k" is fixed to "4". On the other hand, in case of the TDD LTE system, "k" may be changed in accordance with the subframe configuration and the subframe number. Further, during data transmission through a plurality of carriers, the k value may be differently applied in accordance with the TDD configuration of each carrier.

As described above, the wireless communication system has been described based on the LTE system, and the contents of the disclosure are not limited to the LTE system, but may be applied to various wireless communication systems, such as NR and 5G. Further, in an embodiment, in case of applying the disclosure to a different wireless communication system, the k value may be changed and applied even to a system using a modulation scheme corresponding to the FDD.

Figure 3:
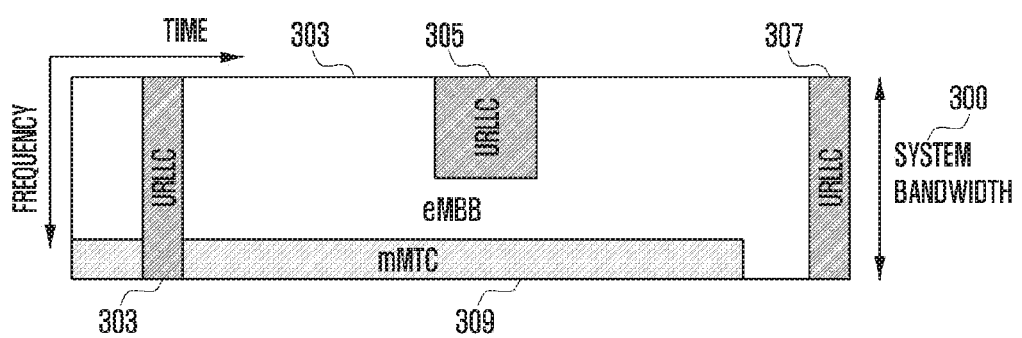
FIG. 3 is a diagram illustrating a case where data for eMBB, URLLC, and mMTC that are services considered in a 5G or NR system are allocated in frequency-time resources.
Figure 4:
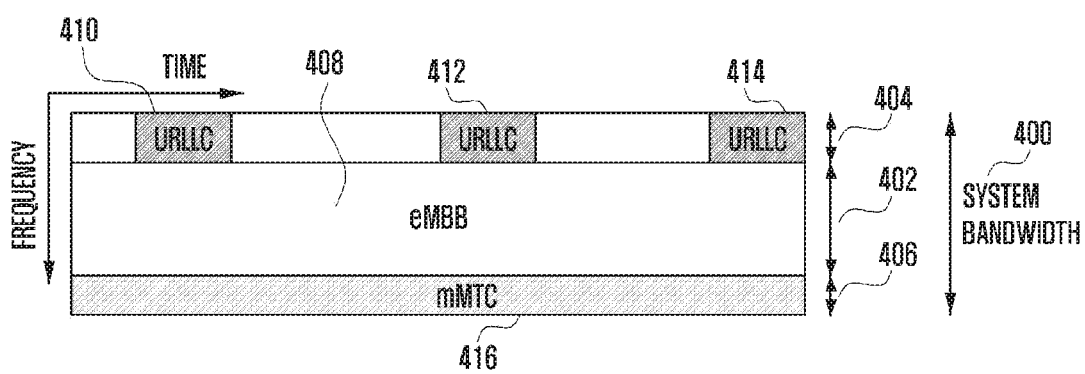
FIG. 4 is a diagram illustrating a case where data for eMBB, URLLC, and mMTC that are services considered in a 5G or NR system are orthogonally allocated in frequency-time resources.

FIGS. 3 and 4 are diagrams illustrating a state where data for eMBB, URLLC, and mMTC, which are services being considered in a 5G or NR system, are allocated in frequency-time resources.

Referring to FIGS. 3 and 4, it can be seen that frequency and time resources are allocated for information transmission in each system.

First, FIG. 3 illustrates that data for eMBB, URLLC, and mMTC are allocated in the frequency band 300 of the whole system. If URLLC data 303, 305, and 307 are generated and transmission of the generated data is necessary while eMBB 301 and mMTC 309 are allocated and transmitted in a specific frequency band, it is possible to transmit the URLLC data 303, 305, and 307 without emptying a portion in which the eMBB 301 and the mMTC 309 have already been allocated or without transmitting the eMBB 301 and the mMTC 309. Since it is necessary to reduce a delay time of the URLLC during the service, the URLLC data 303, 305, and 307 may be allocated and transmitted to a portion of an eMBB-allocated resource 301.

Of course, if the URLLC is additionally allocated and transmitted on the eMBB-allocated resource, eMBB data may not be transmitted in the redundant frequency-time resources, and thus the transmission performance of the eMBB data may be lowered. That is, in the above-described case, an eMBB data transmission failure due to the URLLC allocation may occur.

In FIG. 4, respective subbands 402, 404, and 406 obtained through division of the frequency bandwidth 400 of the whole system may be used for the purpose of transmitting services and data.

Information related to the subband configuration may be predetermined, and this information may be transmitted from the base station to the terminal through higher layer signaling. Further, the subband may be optionally divided by the base station or a network node, and the base station or the network may provide services without transmitting separate subband configuration information to the terminal.

FIG. 4 illustrates a case where subband 402 is used to transmit eMBB data, subband 404 is used to transmit URLLC data, and subband 406 is used to transmit mMTC data.

In the whole embodiment of the disclosure, explanation will be made on the assumption that the length of a transmission time interval (TTI) used for URLLC transmission is shorter than the length of the TTI used for eMBB or mMTC transmission, but the TTI length for the URLLC transmission may also be equal to the TTI length used for the eMBB or mMTC transmission. Further, a response to URLLC-related information may be transmitted earlier than a response time of the eMBB or mMTC, and thus the information can be transmitted and received with low latency.

Hereinafter, an eMBB service is called a first type service, eMBB data is called first type data, and eMBB control information is called first type control information. The first type service, the first type control information, or the first type data is not limited to the eMBB, but may correspond to even a case where at least one of high-speed data transmission and broadband transmission is required.

Further, an URLLC service is called a second type service, URLLC control information is called second type control information, and URLLC data is called second type data. The second type service, the second type control information, or the second type data is not limited to the URLLC, but may be applied to another service or system requiring at least one of a case where low latency is required, a case where high-reliability transmission is necessary, or a case where both the low latency and the high reliability are required at the same time.

Further, an mMTC service is called a third type service, mMTC control information is called third type control information, and mMTC data is called third type data. The third type service, the third type control information, or the third type data is not limited to the mMTC, but may correspond to a case where at least one of low speed or wide coverage, low power, intermittent data transmission, and small-sized data transmission is required. Further, in explaining an embodiment, it may be understood that the first type service includes or does not include the third type service.

In order to transmit at least one of the three types of services, control information, and data as described above, physical layer channel structures being used may differ from each other in accordance with respective service types.

For example, at least one of transmission time interval (TTI) lengths, frequency or time resource allocation units, control channel structures, and data mapping methods may differ from each other. Although three types of different services, control information, and data have been exemplarily described, more types of services, control information, and data may exist, and even in this case, the contents of the disclosure could be applied. Further, in an embodiment of the disclosure, the control information and the data for the services may not be discriminatingly explained, but it may be considered that the control information is included in the data for the services in a range that does not greatly deviate from the scope of the disclosure by the judgment of those skilled in the art to which the disclosure pertains.

The terms "physical channel" and "signal" in the LTE or LTE-A system in the related art may be used to explain a method and a device proposed in the disclosure. However, the contents of the disclosure may be applied to a wireless communication system other than the LTE or LTE-A system.

As described above, in an embodiment of the disclosure, a detailed method for defining transmission and reception operations of a terminal and a base station for transmission of first, second, and third type services or data, and operating terminals, in which different types of services, control information, or data are scheduled, together in the same system. In the disclosure, first, second, and third type terminals indicate terminals in which first, second, and third type services or data are scheduled. In an embodiment of the disclosure, the first, second, and third type terminals may be the same terminal or different terminals. Further, in the terminal supporting transmission and reception of one or more service types according to an embodiment of the disclosure, the contents of the disclosure can be applied to even a case where at least one of the first, second, and third type services is operated in the same cell or carrier or a case where respective service types are operated in different cells or carriers.

Hereinafter, in an embodiment of the disclosure, at least one of an uplink scheduling grant signal and a downlink data signal is called a first signal. Further, in the disclosure, at least one of an uplink data signal for the uplink scheduling grant and a response signal (or HARQ ACK/NACK signal) is called a second signal. In an embodiment, among signals that the base station transmits to the terminal, a signal expecting a response from the terminal may be the first signal, and a response signal of the terminal corresponding to the first signal may be the second signal.

Further, in an embodiment of the disclosure, the service type of the first signal may be at least one of eMBB, URLLC, and mMTC, and the second signal may also correspond to at least one of the above-described services.

Hereinafter, in an embodiment of the disclosure, the TTI length of the first signal is a time value related to transmission of the first signal, and may indicate the length of time in which the first signal is transmitted. Further, in the disclosure, the TTI length of the second signal is a time value related to transmission of the second signal, and may indicate the length of time in which the second signal is transmitted. The TTI length of the third signal is a time value related to transmission of the third signal, and may indicate the length of time in which the third signal is transmitted.

Further, in the disclosure, the transmission and reception timing of the first, second, or third signal may be information on when the terminal transmits the first, second, or third signal and when the base station receives the first, second, or third signal, or when the base station transmits a response or feedback (e.g., ACAK/NACK information) to the received signal, and this may be the transmission and reception timing of the first, second, or third signal.

In this case, as described above, the first, second, or third signal may be considered as any one of signals for the first, second, and third type services. In this case, at least one of TTI lengths of the first, second, and third signals and transmission and reception timings of the first, second, and third signals may be differently configured. For example, the TTI length of the first signal may be equal to the TTI length of the second signal, but may be configured to be longer than the TTI length of the third signal. As another example, the transmission and reception timing of the first and second signals may be configured to n+4, but the transmission and reception timing of the third signal may be configured to be shorter than the above-described transmission and reception timing, for example, may be configured to n+2.

Further, in an embodiment, if it is assumed that the terminal transmits the second signal at the (n+k)-th TTI in case where the base station transmits the first signal at the n-th TTI, it corresponds to notification of the k value that the base station notifies the terminal of the second signal transmission timing. Further, if it is assumed that the terminal transmits the second signal at the (n+t+a)-th TTI in case where the base station transmits the first signal at the n-th TTI, it corresponds to notification of an offset value a based on the value t predefined or derived by a predefined method that the base station notifies the terminal of the second signal transmission timing. In this case, the value t may be predefined as various values in addition to t=4 as described in the disclosure, or may be derived by a predefined method.

Further, the technology proposed in the disclosure can be applied to not only an FDD or TDD system but also a new type duplex mode (e.g., LTE frame structure type 3).

Hereinafter, in the disclosure, higher signaling means a signal transfer method for transferring a signal from a base station to a terminal using a downlink data channel of a physical layer or for transferring a signal from the terminal to the base station using an uplink data channel of the physical layer, and also means signal transfer between the base station and the terminal through at least one method of RRC signaling, PDCP signaling, and MAC control element (MAC CE).

In general, an available power of the terminal may be restricted as compared with an available power of the base station, and may be changed in accordance with time. Accordingly, in the terminal configured to transmit one or more channels to one or more cells at a specific time, if the power required for the configured uplink transmission is higher than an available power at the corresponding uplink transmission time, part of the configured uplink transmission may not be transmitted, or a low power may be configured with respect to transmission of the whole or part of the configured uplink transmission.

For example, in the terminal in which PUCCH transmission for transferring control information at a specific time (hereinafter, PUCCH or PUCCH transmission) and PUSCH transmission for transferring data information (hereinafter, PUSCH or PUSCH transmission) are configured, if the necessary power for the PUCCH and PUSCH transmission is higher than the available power of the terminal, the necessary power may be first allocated to the PUCCH including the control information, and the remaining available power may be allocated to the PUSCH that does not include the control information. In this case, although it is also possible to first allocate the necessary power to the PUSCH transmission and to allocate the remaining available power to the PUSCH, it is preferable to give a priority for power allocation to the channel including the control information since it is general that the control information transmission is important.

In this case, for convenience in explanation, the PUCCH transmission is described using LTE terms, but the meaning and operation of the PUCCH transmission are not limited to the LTE operation. The PUCCH transmission means a general uplink control channel on which the terminal transmits the control information to the base station within a range that does not deviate from the gist of the disclosure.

In the same manner, the PUSCH transmission means a general uplink data channel on which the terminal transmits the data information to the base station.

If the PUSCH transmission configured to simultaneously transmit the control information and the data information (hereinafter, PUSCH+UCI or PUSCH+UCI transmission) is configured in addition to the PUCCH transmission and the PUSCH transmission, the terminal may allocate a necessary power for the PUCCH transmission and may allocate the remaining available power for the PUSCH transmission including the control information or PUSCH+UCI transmission. Thereafter, the terminal may allocate the remaining available power after allocation to the PUCCH and PUSCH+UCI transmission to the PUSCH transmission that does not include the control information.

In this case, in accordance with the control information included in the PUCCH transmission and PUSCH+UCI transmission, the priorities for the PUCCH transmission and the PUSCH+UCI information may be differently configured. For example, the terminal may first allocate the necessary power to the transmission including the control information for transferring the result of downlink transmission to the base station, that is, ACK/NACK information.

In case of the terminal in which communication using one or more different service types is configured in a state where the base station and the terminal support one or more different service types, or in case of the terminal in which communication using TTIs having one or more different lengths is configured in a state where the base station and the terminal support TTIs having one or more different lengths, if the available power of the terminal is lower than the necessary power for the configured uplink transmission, a basis for the terminal to allocate the power with respect to the configured uplink transmission is necessary.

Accordingly, in case of the terminal in which communication using one or more different service types is configured in a state where the base station and the terminal support one or more different service types, or in case of the terminal in which communication using TTIs having one or more different lengths is configured in a state where the base station and the terminal support TTIs having one or more different lengths as described above, if the available power of the terminal is lower than the necessary power for the configured uplink transmission, the disclosure proposes a method for performing power allocation (or power configuration or power control) based on at least one of a service type and a TTI length through determination of the power allocation basis depending on whether to include control information and the type of the control information during uplink transmission configured by the base station.

In this case, even if uplink transmission is performed without separate uplink transmission configuration information from the base station (e.g., if uplink transmission is performed through predefined resources or resources configured by the base station without reception of separate UL grant), it is possible to apply the power allocation basis proposed in the disclosure.

In the disclosure, for convenience in explanation, although explanation will be made on the assumption that the terminal calculates the used power based on subframe i (e.g., 1 ms), it is also possible for the terminal to calculate the power in the unit of a symbol or in the unit of a transmission time interval (TTI).

(1-1)-th Embodiment

The (1-1)-th embodiment relates to a method for allocating an available power of a terminal based on at least one of a service type for configured uplink transmission, a channel type, whether to include control information, and TTI length in case of the terminal in which communication using one or more different service types is configured in a state where the base station and the terminal support one or more different service types, or in case of the terminal in which communication using TTIs having one or more different lengths is configured in a state where the base station and the terminal support TTIs having one or more different lengths as described above.

Hereinafter, in the disclosure, explanation will be made on a method for a terminal configured to perform communication using one or more transmission interval lengths to define a basis for power allocation on the assumption that communication is performed using a relatively long transmission interval length or a normal transmission interval length configured between the base station and the terminal (hereinafter, normal TTI or nTTI) and on the assumption that communication is performed using a transmission interval length that is shorter than the configured nTTI (hereinafter, short TTI or sTTI).

In this case, the disclosure can be applied to even a case where two or more different transmission interval lengths are provided.

Further, in the disclosure, for convenience in explanation, it is exemplified that at least one uplink transmission is configured among a control information transmission channel for transmitting UCI information using nTTI (hereinafter, nPUCCH), an uplink data transmission channel for transmitting uplink data information using nTTI (hereinafter, nPUSCH), and a channel for transmitting uplink control information and uplink data information using nTTI (hereinafter, nPUSCH+UCI). However, even in case of an uplink transmission that is different from the above-described example of uplink transmission, it is possible to apply a power allocation method proposed in the disclosure within a range that does not deviate from the gist of the disclosure.

Further, the uplink control information (UCI) may include at least one of the downlink reception result (ACKNACK feedback) using nTTI, downlink channel state information (CSI) measured using nTTI, the downlink reception result using sTTI, and downlink channel state information measured using sTTI.

Further, in the disclosure, explanation will be made on the assumption that nPUCCH, nPUSCH+UCI, and nPUSCH uplink transmissions having the same transmission interval length, but the disclosure can be applied even in case where at least one or more information transmission channels have different transmission interval lengths.

In a similar manner to the case of nTTI as described above, in the disclosure, for convenience in explanation, it is exemplified that at least one uplink transmission is configured among a control information transmission channel for transmitting UCI information using sTTI (hereinafter, sPUCCH), an uplink data transmission channel for transmitting uplink data information using sTTI (hereinafter, sPUSCH), and a channel for transmitting uplink control information and uplink data information using sTTI (hereinafter, sPUSCH+UCI). However, even in case of an uplink transmission that is different from the above-described example of uplink transmission, it is possible to apply a power allocation method proposed in the disclosure within a range that does not deviate from the gist of the disclosure.

Further, the uplink control information (UCI) may include at least one of the downlink reception result (ACK/NACK feedback) using sTTI, downlink channel state information (CSI) measured using sTTI, the downlink reception result using sTTI, and downlink channel state information measured using sTTI.

Further, in the disclosure, explanation will be made on the assumption that sPUCCH, sPUSCH+UCI, and sPUSCH uplink transmissions having the same transmission interval length, but the disclosure can be applied even in case where at least one or more information transmission channels have different transmission interval lengths.

In general, it is preferable that communication is performed using a relatively short transmission interval length with respect to a service having high requirements against a transmission delay, and communication is performed using a relatively long transmission interval length with respect to a service requiring a high data transmission rate. Accordingly, the terminal is assumed, in which communication using TTI having one or more different lengths is configured in a state where the base station and the terminal support the TTI having one or more different lengths. If the available power of the terminal is lower than the power necessary for uplink transmission configured to the terminal at a time when uplink transmission configured by the base station is performed, the terminal may preferentially allocate the power to the uplink transmission having a short TTI length rather than the uplink transmission having a relatively long TTI length. That is, the terminal may first allocate the available power to the uplink transmission using the corresponding sTTI. In this case, the uplink transmission may include uplink transmission to perform transmission in accordance with a predefined or configured uplink transmission method without uplink transmission through a separate uplink grant from the base station.

This will be described in more detail. A terminal is assumed, in which at least one uplink transmission is configured by the base station among nPUCCH, nPUSCH+UCI, and nPUSCH transmissions in subframe i, and at least one uplink transmission is configured among sPUCCH, sPUSCH+UCI, and sPUSCH transmissions in the same subframe n. In this case, the terminal may preferentially allocate the available power of the terminal to the uplink transmission through the uplink transmission having a short TTI length (hereinafter, sTTI), and may allocate the remaining available power to the uplink transmission having a relatively long TTI length (hereinafter, nTTI) after the power allocation for the sTTI uplink transmission. In this case, with respect to uplink transmissions having the same TTI length, the terminal may first allocate the available power of the terminal to the uplink transmission for a control channel (sPUCCH or nPUCCH transmission).

For example, the terminal, in which at least one uplink transmission among sPUCCH, sPUSCH, nPUCCH, and nPUSCH is configured in subframe i, may first allocate the uplink power necessary for transmission of sPUCCH and sPUSCH having a short TTI length, and then may allocate the remaining available power to transmission of nPUCCH and nPUSCH. In this case, if sPUCCH and sPUSCH have the same transmission length, the terminal may first allocate the available power to the sPUCCH transmission in preference to the uplink transmission for the control channel, and then may allocate the remaining available power to the sPUSCH transmission. The transmission power may also be allocated to the nPUCCH and nPUSCH in accordance with the sPUCCH and sPUSCH transmission allocation method.

Further, with respect to transmission of uplink data channels having the same TTI length, the terminal may preferentially allocate the power to the uplink transmission (sPUSCH+UCI or nPUSCH+UCI transmission) configured to include the uplink control information in the data channel to be transmitted as compared with the uplink transmission (sPUSCH or nPUSCH transmission) configured to include only the data information in the data channel to be transmitted. In this case, the terminal may preferentially allocate the power to the uplink transmission for the control channels having the same TTI length as compared with the uplink transmission configured to include the uplink control information in the uplink data channel to be transmitted.

For example, the terminal, in which simultaneous transmission of PUCCH and PUSCH is configured and at least one uplink transmission among sPUCCH, sPUSCH, sPUSCH+UCI, nPUCCH, nPUSCH, and nPUSCH+UCI transmissions is configured in subframe i, may first allocate the uplink power necessary for transmission of sPUCCH, sPUSCH, and sPUSCH+UCI having a short TTI length, and then may allocate the remaining available power to transmission of nPUCCH, nPUSCH, and nPUSCH+UCI. In this case, if sPUCCH, sPUSCH, and sPUSCH+UCI have the same transmission length, the terminal may first allocate the available power to the sPUCCH transmission in preference to the uplink transmission for the control channel. In this case, the terminal may allocate the remaining available power to the sPUSCH and sPUSCH+UCI transmissions, and in preference to the sPUSCH+UCI transmission including the uplink control information, the terminal may first allocate the remaining available power to the sPUSCH+UCI transmission, and then may allocate the remaining available power to the sPUSCH transmission. In this case, the transmission power allocation to the nPUCCH, nPUSCH, and nPUSCH+UCI may be performed in accordance with the same priority as that of the sPUCCH, sPUSCH, and sPUSCH+UCI transmission allocation method.

This will be exemplarily described in more detail.

Explanation will be made on the assumption that at least one uplink transmission among sPUCCH, sPUSCH+UCI, sPUSCH, nPUCCH, nPUSCH+UCI, and nPUSCH is configured in the terminal capable of performing simultaneous transmission through sPUCCH and sPUSCH in subframe i.

If it is assumed that the maximum available power of the terminal is $P_{CMAX}$ and the power that is necessary for sPUCCH transmission is $P_{sPUCCH}(i)$, the sPUSCH+UCI uplink transmission power can be determined as follows.

$$P_{sPUSCH,b}(i) = \min(P_{sPUSCH,b}(i), (P_{CMAX}(i) - P_{sPUCCH,a}(i))) \quad \text{[Mathematical expression 1a]}$$

Here, $P_{sPUCCH,a}$ denotes a power necessary to transmit sPUCCH to a cell a, and $P_{sPPUCCH,b}$ denotes a power necessary to transmit sPUSCH+UCI to a cell b. In other words, the terminal may first calculate the power necessary to transmit the sPUCCH to the cell a in an available power. Further, the terminal can calculate sPUSCH+UCI transmission power using the minimum value of the remaining power excluding the power to be used for the sPUCCH transmission and the power necessary to transmit the sPUSCH+UCI to the cell b. Thereafter, the sPUSCH transmission power can be calculated as follows.

[Mathematical expression 1b]

$$\sum_{c \neq b} w_s(i) P_{sPUSCH,c}(i) \leq (P_{CMAX}(i) - P_{sPUCCH,a}(i) - P_{sPUSCH,b}(i))$$

In this case, $W_s(i)$ denotes a value for equally allocating the remaining power excluding a transmission power for sPUCCH and sPUSCH+UCI transmission to cells that require sPUSCH transmission, and may be configured as a value between 0 and 1.

Further, the terminal may calculate the power necessary for the nPUCCH, nPUSCH+UCI, and nPUSCH transmission in the above-described method. That is, the nPUCCH transmission power that is transmitted to a cell d can be calculated as follow.

Thereafter, the terminal can calculate a power necessary for transmission of nPUCCH, nPUSCH+UCI, and nPUSCH in the above-described method. That is, nPUCCH transmission power transmitted to a cell d can be calculated as follow.

[Mathematical expression 1c]

$$P_{nPUCCH,d}(i) = \min\Big(P_{nPUCCH,d}(i),$$
$$P_{CMAX}(i) - P_{sPUCCH,a}(i) - P_{sPUSCH,b}(i) - \sum_{c \neq b} w_s(i) P_{sPUSCH,c}(i)\Big)$$

Here, $P_{nPUCCH,d}$ denotes a transmission power necessary to transmit nPUCCH to a cell d.

Further, since the configuration of the nPUSCH+UCI and nPUSCH transmission power can be allocated through modification of the above-described mathematical expressions, the detailed explanation thereof will be omitted. Further, in the above-described example, explanation has been made on the assumption that sPUCCH, sPUSCH+UCI, sPUSCH, nPUCCH, nPUSCH+UCI, and nPUSCH transmission cells are different from one another, but it is also possible that the at least one uplink transmission is performed in the same cell.

If one or more sPUCCH transmission cells are configured, the same power can be allocated between sPUCCH transmission cells, or the available power can be successively allocated in ascending order of indexes of the sPUCCH transmission cells. Similarly, if one or more sPUCCH+UCI transmission cells are configured, the same power can be allocated between sPUCCH+UCI transmission cells, or the available power can be successively allocated in ascending order of indexes of the sPUCCH+UCI transmission cells.

In general, among the control information, the ACK/NACK control information is more important than any other control information excluding the ACK/NACK. This is because the ACK/NACK information is information on the result of downlink or uplink transmission between the base station and the terminal, and in accordance with the result, the base station and the terminal can perform retransmission of the transmitted information or transmission of new data. Accordingly, with respect to the uplink transmission having the same TTI length, the terminal can preferentially allocate the uplink transmission power to the uplink transmission including the ACK/NACK control information as compared with the uplink transmission that does not include the ACK/NACK control information.

Another method for configuring priority of transmission power allocation in accordance with a control information type will be exemplarily described. In general, a rank indicator (RI) is a variable for determining the number of transmittable codewords between the base station and the terminal, and is more important than CQI or PMI. Accordingly, if ACK/NACK control information transmission is not included in the control information, or if the same ACK/NACK information is included in one or more uplink transmissions, the uplink transmission power can be preferentially allocated to the uplink transmission in which the control information including the RI is included.

Similarly, the terminal can determine the priority for the uplink transmission power in accordance with the control information type in the same TTI. For example, the priority can be determined in the order of beam index, precoding index, and CQI information.

It is merely exemplary to determine the priority of the uplink transmission power in accordance with the control information type, and it is also possible to configure the priority of the uplink transmission power in the order different from that in the above-described example. For example, it is also possible to determine the priority in the order of beam index, CQI, and precoding index.

In this case, the terminal may transfer the available power remaining after performing the uplink transmission configured in subframe i to the base station. This is called a power head room (PHR) report. If the uplink transmission for the TTIs having one or more different lengths is configured in subframe i in the base station and the terminal supporting one or more different TTIs, the terminal can calculate the PHR in the following method.

The terminal can calculate the PHR in accordance with PHR calculation TTI basis predefined or configured by the base station through a higher layer signal. As another method, the terminal can calculate the PHR based on the longest TTI among TTI lengths in a subframe in which the uplink transmission is configured. As still another method, the terminal calculates the PHR based on the smallest TTI among the TTI lengths in the subframe in which the uplink transmission is configured.

More specifically, the terminal can calculate the PHR based on a PHR calculation basis predefined or received from the base station through the higher layer signal, TTI length for PHR calculation, for example, subframe length configured in the system or cell, or symbol length. In case of calculating the PHR based on the symbol length predefined or received from the base station or the longest TTI, the terminal may calculate the PHR for each symbol and perform the PHR report to the base station, or may report an average value of the PHR calculated in the unit of a symbol to the base station. If the TTI length at which the uplink transmission is configured is shorter than the configured PHR calculation basis, the terminal may perform calculation on the assumption that the small TTI is continuously transmitted during the configured PHR calculation basis.

If the sTTI transmission is possible in subframe i although the sTTI transmission in the subframe i is not configured at the PHR calculation basis time or up to the subframe i, the terminal can calculate the PHR on the assumption that the sTTI transmission is performed even if the sTTI transmission is not configured when calculating the PHR in the subframe i. In other words, when the terminal calculates the PHR in the subframe i, if the sTTI transmission is possible in subframe i although the sTTI transmission in the subframe i is not configured, the terminal can calculate the PHR on the assumption of the sTTI transmission.

(1-2)-th Embodiment

The (1-2)-th embodiment relates to a method for allocating an available power of a terminal based on at least one of a service type for configured uplink transmission, a channel type, whether to include control information, and TTI length in case of the terminal in which communication using one or more different service types is configured in a state where the base station and the terminal support one or more different service types, or in case of the terminal in which communication using TTIs having one or more different lengths is configured in a state where the base station and the terminal support TTIs having one or more different lengths as described above.

Hereinafter, in the disclosure, explanation will be made on a method for a terminal configured to perform communication using one or more transmission interval lengths to define a basis for power allocation on the assumption that communication is performed using a relatively long transmission interval length or a normal transmission interval length configured between the base station and the terminal (hereinafter, normal TTI or nTTI) and on the assumption that communication is performed using a transmission interval length that is shorter than the configured nTTI (hereinafter, short TTI or sTTI).

In this case, the disclosure can be applied to even a case where two or more different transmission interval lengths are provided.

Further, in the disclosure, for convenience in explanation, it is exemplified that at least one uplink transmission is configured among a control information transmission channel for transmitting UCI information using nTTI (hereinafter, nPUCCH), an uplink data transmission channel for transmitting uplink data information using nTTI (hereinafter, nPUSCH), and a channel for transmitting uplink control information and uplink data information using nTTI (hereinafter, nPUSCH+UCI). However, even in case of an uplink transmission that is different from the above-described example of uplink transmission, it is possible to apply a power allocation method proposed in the disclosure within a range that does not deviate from the gist of the disclosure.

Further, the uplink control information (UCI) may include at least one of the downlink reception result (ACKNACK feedback) using nTTI, downlink channel state information (CSI) measured using nTTI, the downlink reception result using sTTI, and downlink channel state information measured using sTTI.

Further, in the disclosure, explanation will be made on the assumption that nPUCCH, nPUSCH+UCI, and nPUSCH uplink transmissions having the same transmission interval length, but the disclosure can be applied even in case where at least one or more information transmission channels have different transmission interval lengths.

In a similar manner to the case of nTTI as described above, in the disclosure, for convenience in explanation, it is exemplified that at least one uplink transmission is configured among a control information transmission channel for transmitting UCI information using sTTI (hereinafter, sPUCCH), an uplink data transmission channel for transmitting uplink data information using sTTI (hereinafter, sPUSCH), and a channel for transmitting uplink control information and uplink data information using sTTI (hereinafter, sPUSCH+UCI). However, even in case of an uplink transmission that is different from the above-described example of uplink transmission, it is possible to apply a power allocation method proposed in the disclosure within a range that does not deviate from the gist of the disclosure.

Further, the uplink control information (UCI) may include at least one of the downlink reception result (ACK/NACK feedback) using sTTI, downlink channel state information (CSI) measured using sTTI, the downlink reception result using sTTI, and downlink channel state information measured using sTTI. Further, in the disclosure, explanation will be made on the assumption that sPUCCH, sPUSCH+UCI, and sPUSCH uplink transmissions having the same transmission interval length, but the disclosure can be applied even in case where at least one or more information transmission channels have different transmission interval lengths.

In general, in performing communication between the base station and the terminal, control information is more important than data information. For example, ACK/NACK information is information on the result of downlink or uplink transmission between the base station and the terminal, and in accordance with the result, the base station and the terminal may perform retransmission of the transmitted information, or may perform transmission of new data. Further, the channel measurement related control information, such as RI, PMI, and CQI, can heighten the communication efficiency between the base station and the terminal by transferring the channel characteristics measured by the terminal to the base station. Accordingly, if the available power of the terminal, in which communication using TTI having one or more different lengths is configured in a state where the base station and the terminal support the TTI having one or more different lengths, is lower than the power necessary for uplink transmission configured to the terminal at a time when uplink transmission configured by the base station is performed, the terminal may preferentially allocate the available power to the uplink transmission for the channel that does not include the control information as compared with the uplink transmission for the channel that does not include the control information. Further, the terminal may allocate the remaining available power to the uplink transmission for the channel that does not include the control information.

This will be described in more detail. It is assumed that at least one uplink transmission is configured by the base station among nPUCCH, nPUSCH+UCI, and nPUSCH transmissions in subframe i, and at least one uplink transmission is configured among sPUCCH, sPUSCH+UCI, and sPUSCH transmissions in the same subframe n. In this case, the terminal may preferentially allocate the power to the uplink transmission for transmitting the control channel (sPUCCH or nPUCCH). That is, the terminal may first allocate the available power of the terminal to the uplink transmission in which the sPUCCH or nPUCCH uplink transmission is configured, and then may allocate the remaining available power to the uplink transmission for the data channel.

In this case, among the uplink transmissions for the same control channel or data channel, the terminal may preferentially allocate the available power of the terminal to the uplink transmission having a short TTI length.

For example, the terminal, in which at least one uplink transmission among sPUCCH, sPUSCH, nPUCCH, and nPUSCH is configured in subframe i, may first allocate the uplink power necessary for transmission of sPUCCH and nPUCCH that are control channels for transferring the control information, and then may allocate the remaining available power to transmission of sPUSCH and nPUSCH that are data channels for transferring the data information. In this case, if both the sPUCCH and nPUCCH transfer the control information, the terminal may first allocate the available power to the sPUCCH transmission in preference to the transmission having a short TTI length among the uplink transmissions for the control channel, and then may allocate the remaining available power to the nPUCCH transmission.

Similarly, the transmission power for the sPUSCH and nPUSCH can be allocated in accordance with the sPUCCH and nPUCCH transmission allocation method. In this case, since the sPUSCH+UCI transmission also includes the control information, it is possible to preferentially allocate the power to the sPUSCH+UCI transmission having a short transmission TTI length as compared with the nPUCCH transmission.

Further, with respect to uplink data channel transmission, the terminal may preferentially allocate the power to the uplink transmission (sPUSCH+UCI or nPUSCH+UCI transmission) configured to include the uplink control information in the data channel to be transmitted as compared with the uplink transmission (sPUSCH or nPUSCH transmission) configured to include only the data information. In this case, if it is configured to include the same uplink control information in the uplink data channel transmission to be transmitted, the terminal may preferentially allocate the power to the uplink transmission having a short TTI length.

For example, the terminal, in which simultaneous transmission of PUCCH and PUSCH is configured and at least one uplink transmission among sPUCCH, sPUSCH, sPUSCH+UCI, nPUCCH, nPUSCH, and nPUSCH+UCI transmissions is configured in subframe i, may first allocate the uplink power necessary for transmission of sPUCCH and sPUCCH for transferring the control information, and then may allocate the remaining available power to the uplink transmission for a data channel configured to include the control information, sPUSCH+UCI and nPUSCH+UCI transmission.

In this case, in case of transferring the same control information, the power necessary for the sPUCCH transmission and the sPUSCH+UCI transmission may be preferentially allocated to the uplink transmission for the channel having a short TTI length, and the remaining available power may be allocated to the nPUCCH transmission and nPUSCH+UCI transmission.

Further, the terminal can allocate the remaining available power to the sPUSCH and nPUSCH transmission, and in the same manner, the terminal can preferentially allocate the available power of the terminal to the sPUSCH transmission having a short TTI length.

This will be exemplarily described in more detail.

Explanation will be made on the assumption that at least one uplink transmission among sPUCCH, sPUSCH+UCI, sPUSCH, nPUCCH, nPUSCH+UCI, and nPUSCH is configured in the terminal capable of performing simultaneous transmission through sPUCCH and sPUSCH in subframe i.

If it is assumed that the maximum available power of the terminal is $P_{CMAX}(i)$, and the power that is necessary for sPUCCH transmission is $P_{sPUCCH}(i)$, the nPUCCH uplink transmission power can be determined as follows.

$$P_{nPUCCH,d}(i) = \min(P_{nPUCCH,d}(i), (P_{CMAX}(i) - P_{sPUCCH,a}(i))) \quad \text{[Mathematical expression 1d]}$$

Here, $P_{sPUCCH,a}$ denotes a power necessary to transmit sPUCCH to a cell a, and $P_{nPUCCH,c}$ denotes a power necessary to transmit sPUCCH to a cell d. In other words, the terminal may first calculate the power necessary to transmit the sPUCCH to the cell a in an available power. Further, the terminal can calculate nPUCCH transmission power using the minimum value of the remaining power excluding the power to be used for the sPUCCH transmission and the power necessary to transmit the nPUCCH to the cell d. Thereafter, the sPUSCH+UCI transmission power and the nPUSCH+UCI transmission power can be calculated as follows.

$$P_{sPUSCH,b}(i) = \min(P_{sPUSCH,b}(i), (P_{CMAX}(i) - P_{sPUCCH,a}(i) - P_{nPUCCH,d}(i))),$$

$$P_{nPUSCH,e}(i) = \min(P_{nPUSCH,e}(i), (P_{CMAX}(i) - P_{sPUCCH,a}(i) - P_{nPUCCH,d}(i) - P_{sPUSCH,b}(i))) \quad \text{[Mathematical expression 1e]}$$

$P_{sPUCCH,b}$ denotes a power necessary to transmit sPUSCH+UCI to a cell b, and $P_{nPUSCH,e}$ denotes a power necessary to transmit nPUSCH+UCI to a cell e.

Hereinafter, the remaining available power for allocating one or more sPUSCH and one or more nPUSCH can be calculated as follows.

[Mathematical expression 1f]

$$\sum_{c \neq b} w_s(i) P_{sPUSCH,c}(i) \leq$$
$$(P_{CMAX}(i) - P_{sPUCCH,a}(i) - P_{nPUCCH,d}(i) - P_{sPUSCH,b}(i) - P_{nPUSCH,c}(i))$$
$$\sum_{f \neq e} w_n(i) P_{nPUSCH,f}(i) \leq (P_{CMAX}(i) - P_{sPUCCH,a}(i) - P_{nPUCC,d}(i) -$$
$$P_{sPUSCH,b}(i) - P_{nPUSCH,a}(i) - \sum_{c \neq b} w_s(i) P_{sPUSCH,c}(i))$$

In this case, $P_{sPUCCH,e}$ denotes a power necessary to transmit sPUSCH+UCI to a cell b, and $P_{nPUSCH,e}$ denotes a power necessary to transmit nPUSCH+UCI to a cell e. $W_s(i)$ denotes a value for equally allocating an available power of the terminal to cells requiring sPUSCH transmission, and may be configured as a value between 0 and 1. $W_n(i)$ denotes a value for equally allocating an available power of the terminal to cells requiring nPUSCH transmission, and may be configured as a value between 0 and 1.

Further, in addition to a method for allocating the same power to uplink transmission as described above, it is also possible to successively allocate an available power in ascending order of indexes of uplink transmission cells.

In general, among the control information, the ACK/NACK control information is more important than any other control information excluding the ACK/NACK. This is because the ACK/NACK information is information on the result of downlink or uplink transmission between the base station and the terminal, and in accordance with the result, the base station and the terminal can perform retransmission of the transmitted information or transmission of new data. Accordingly, during allocation of the transmission power to the uplink transmission, the terminal can preferentially allocate the uplink transmission power to the uplink transmission including the ACK/NACK control information as compared with the uplink transmission that does not include the ACK/NACK control information.

For example, in case where ACK/NACK information is not included in sPUCCH transmission, but at least one ACK/NACK is included in nPUCCH, it is also possible that the terminal first configures the power necessary for nPUCCH transmission and allocates the remaining available power to sPUCCH.

Further, in a similar manner to that as described above, another method for configuring priority of transmission power allocation in accordance with a control information type will be exemplarily described.

In general, a rank indicator (RI) is a variable for determining the number of transmittable codewords between the base station and the terminal, and is more important than CQI or PMI. Accordingly, if ACK/NACK control information transmission is not included in the control information, or if the same ACK/NACK information is included in one or more uplink transmissions, the terminal can preferentially allocate the uplink transmission power to the uplink transmission in which the control information including the RI is included. Accordingly, the terminal can determine the priority in the order of uplink transmissions including RI, beam index, precoding index, and CQI information.

However, it is merely exemplary to determine the priority of the uplink transmission power in accordance with the control information type, and it is also possible to configure the priority of the uplink transmission power in the order different from that in the above-described example. For example, it is also possible to determine the priority in the order of beam index, CQI, and precoding index.

In this case, the terminal may transfer the available power remaining after performing the uplink transmission configured in subframe i to the base station. This is called a power head room (PHR) report. If the uplink transmission for the TTIs having one or more different lengths is configured in subframe i in the base station and the terminal supporting one or more different TTIs, the terminal can calculate the PHR in the following method.

The terminal can calculate the PHR in accordance with PHR calculation TTI basis predefined or configured by the base station through a higher layer signal. As another method, the terminal can calculate the PHR based on the longest TTI among TTI lengths in a subframe in which the uplink transmission is configured. As still another method, the terminal calculates the PHR based on the smallest TTI among the TTI lengths in the subframe in which the uplink transmission is configured.

More specifically, the terminal can calculate the PHR based on a PHR calculation basis predefined or received from the base station through the higher layer signal, TTI length for PHR calculation, for example, subframe length configured in the system or cell, or symbol length. In case of calculating the PHR based on the symbol length predefined or received from the base station or the longest TTI, the terminal may calculate the PHR for each symbol and perform the PHR report to the base station, or may report an average value of the PHR calculated in the unit of a symbol to the base station. If the TTI length at which the uplink transmission is configured is shorter than the configured PHR calculation basis, the terminal may perform calculation on the assumption that the small TTI is continuously transmitted during the configured PHR calculation basis.

If the sTTI transmission is possible in subframe i although the sTTI transmission in the subframe i is not configured at the PHR calculation basis time or up to the subframe i, the terminal can calculate the PHR on the assumption that the sTTI transmission is performed even if the sTTI transmission is not configured when calculating the PHR in the subframe i. In other words, when the terminal calculates the PHR in the subframe i, if the sTTI transmission is possible in subframe i although the sTTI transmission in the subframe i is not configured, the terminal can calculate the PHR on the assumption of the sTTI transmission.

Figure 5:
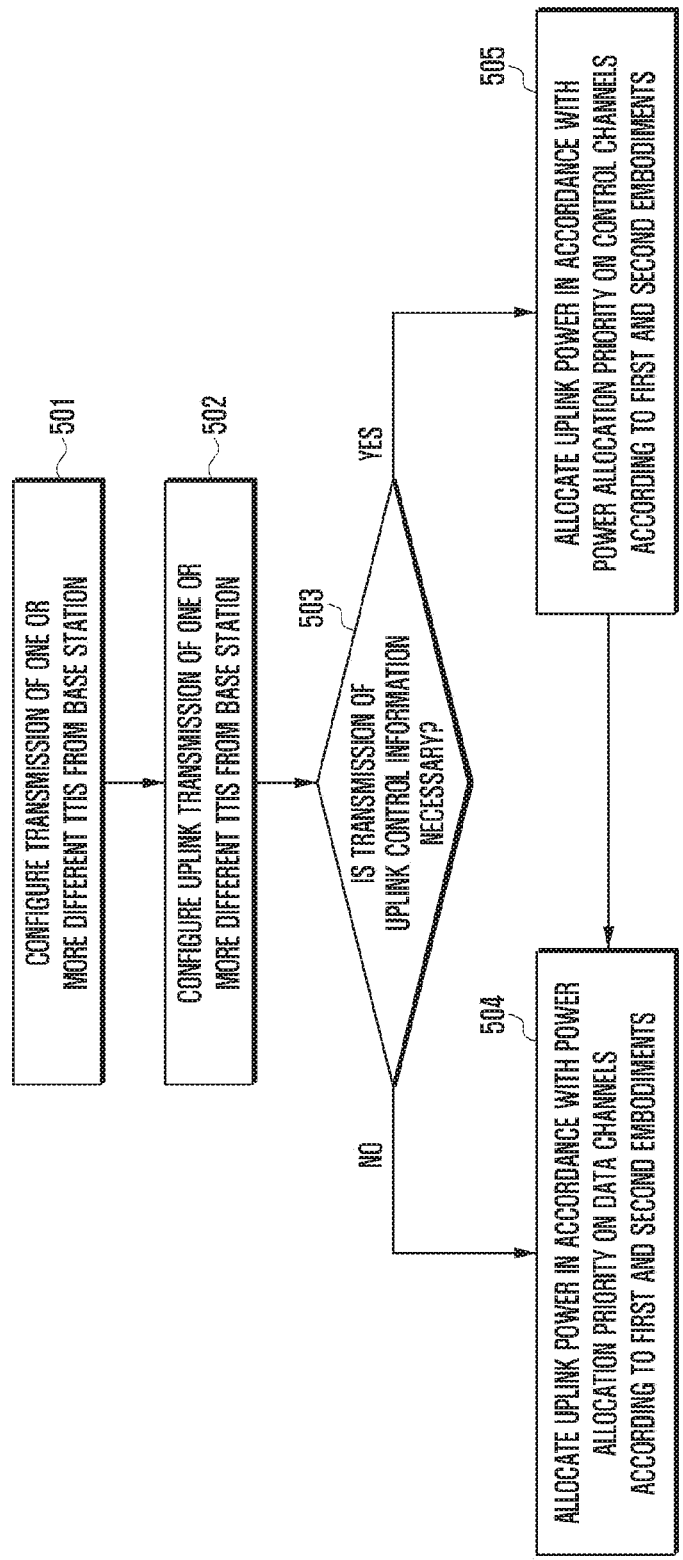
FIG. 5 is a diagram illustrating a terminal operation according to an embodiment of the disclosure.

FIG. 5 is a diagram illustrating a terminal operation according to an embodiment of the disclosure.

Referring to FIG. 5, explanation will be made on a method for a terminal, in which communication using one or more different service types is configured, to configure a basis for power allocation for uplink transmission using at least one of whether to include control information transmission and control information types in a base station and a terminal supporting one or more different service types or in a base station and a terminal supporting TTI having one or more different lengths.

At operation 501, the terminal may be configured by the base station to perform communication using one or more different service types or one or more different TTIs in at least one cell.

Further, through at least one of cases where transmission is necessary with respect to a response on a downlink data channel received from the base station, an uplink data channel is scheduled by the base station, and transmission of uplink control information measured by the terminal is requested by the base station, the terminal, at operation 502, may receive configuration of the uplink transmission using one or more different TTIs.

At operation 502, if transmission of the control information is necessary in a state where the transmission interval length of the uplink transmission in which the uplink transmission is configured and the TTI length are differently configured, the terminal, at operation 505, successively allocates a power for uplink control information transmission in accordance with the priority for power allocation with respect to the control channel as described above through the (1-1)-th embodiment or the (1-2)-th embodiment of the disclosure.

In this case, power allocation for the control channel may include transmission of both control information and data information through the data channel. If an available power remains and transmission of the uplink data channel is configured after performing the power allocation to the uplink transmission for the control information transmission, the terminal, at operation 504, may allocate the power for the uplink data transmission in accordance with the priority for the power allocation to the data channel as described above in the (1-1)-th embodiment or the (1-2)-th embodiment of the disclosure.

On the other hand, to perform the above-described embodiments, the terminal or the base station may include a transmitter, a receiver, and a processor. In the (1-1)-th embodiment and the (1-2)-th embodiment, a transmission and reception method by the base station and the terminal for determining the transmission and reception timing of a second signal and performing the following operation is presented, and the transmitter, the receiver, and the processor can perform the above-described operation. In an embodiment, the transmitter and the receiver may be mentioned as a transceiver capable of performing all functions of the transmitter and the receiver, and the processor may be mentioned as a controller.

Figure 6:
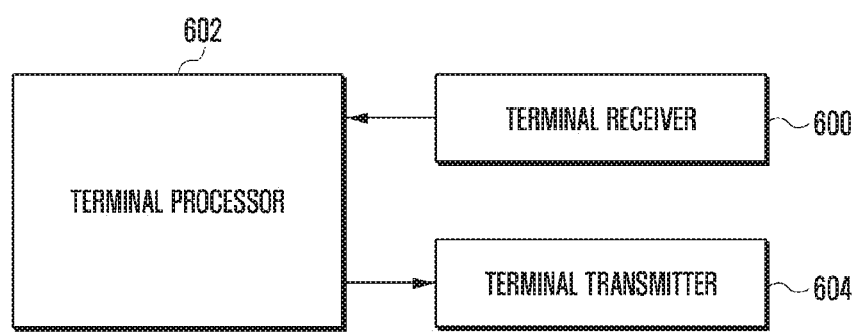
FIG. 6 is a block diagram illustrating the structure of a terminal according to an embodiment of the disclosure.

FIG. 6 is a block diagram illustrating the structure of a terminal according to an embodiment of the disclosure.

Referring to FIG. 6, a terminal according to the disclosure may include a terminal receiver 600, a terminal transmitter 604, and a terminal processor 602. In an embodiment, the terminal receiver 600 and the terminal transmitter 604 may be commonly called a transceiver. The transceiver may transmit/receive a signal with a base station. The signal may include control information and data. For this, the transceiver may be composed of an RF transmitter for up-converting and amplifying the frequency of a transmitted signal, and an RF receiver for low-noise-amplifying and down-converting the frequency of a received signal. Further, the transceiver may receive a signal through a radio channel, and may output the received signal to the terminal processor 602. The transceiver may also transmit the signal that is output from the terminal processor 602 through the radio channel. The terminal processor 602 may operate a series of processes so as to operate according to the above-described embodiments. For example, the terminal receiver 600 may operate to receive a signal that includes second signal transmission timing information from the base station, and the terminal processor 602 may operate to analyze the second signal transmission timing. Thereafter, the terminal transmitter 604 may transmit the second signal in the above-described timing.

Figure 7:
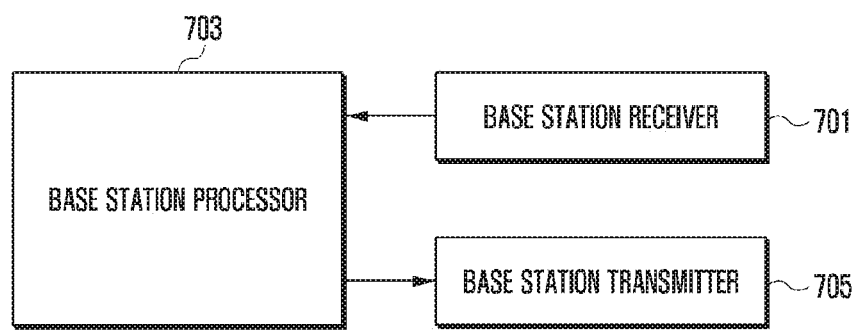
FIG. 7 is a block diagram illustrating the structure of a terminal according to an embodiment of the disclosure.

FIG. 7 is a block diagram illustrating the structure of a base station according to an embodiment of the disclosure.

Referring to FIG. 7, a base station according to embodiments of the disclosure may include at least one of a base station receiver 701, a base station transmitter 705, and a base station processor 703. In an embodiment of the disclosure, the base station receiver 701 and the base station transmitter 705 may be commonly called a transceiver. The transceiver may transmit/receive a signal with a terminal. The signal may include control information and data. For this, the transceiver may be composed of an RF transmitter for up-converting and amplifying the frequency of a transmitted signal, and an RF receiver for low-noise-amplifying and down-converting the frequency of a received signal. Further, the transceiver may receive a signal through a radio channel, and may output the received signal to the base station processor 703. The transceiver may also transmit the signal that is output from the base station processor 703 through the radio channel. The base station processor 703 may operate a series of processes so as to operate according to the above-described embodiments. For example, the base station processor 703 may operate to determine the second signal transmission timing, and to generate the second signal transmission timing information to be transferred to the terminal. Thereafter, the base station transmitter 705 may transfer the timing information to the terminal, and the base station receiver 701 may receive the second signal in the above-described timing.

Further, according to an embodiment of the disclosure, the base station processor 703 may operate to generate downlink control information (DCI) that includes the second signal transmission timing information. In this case, the DCI may indicate the second signal transmission timing information.

On the other hand, the embodiments of the disclosure that are described in the specification and drawings are merely for easy explanation of the technical contents of the disclosure and proposal of specific examples to help understanding of the disclosure, but are not intended to limit the scope of the disclosure. That is, it will be apparent to those of ordinary skill in the art to which the disclosure pertains that other modified examples that are based on the technical idea of the disclosure can be embodied. Further, according to circumstances, the respective embodiments may be operated in combination. For example, parts of the first, second, and third embodiments of the disclosure may be combined with each other to operate the base station and the terminal. Further, although the above-described embodiments have been proposed on the basis of an NR system, other modified examples based on the technical idea of the above-described embodiments may be embodied in other systems, such as FDD and TDD LTE systems.

Although preferred embodiments of the disclosure have been described in the specification and drawings and specific wordings have been used, these are merely used as general meanings to assist those of ordinary skill in the art to gain a comprehensive understanding of the disclosure, and do not limit the scope of the disclosure. It will be apparent to those of ordinary skill in the art to which the disclosure pertains that various modifications are possible on the basis of the technical concept of the disclosure in addition to the embodiments disclosed herein.

Second Embodiment

Hereinafter, an operation method capable of reducing a delay by performing transmission and reception using a short transmission time interval will be described.

Figure 8:
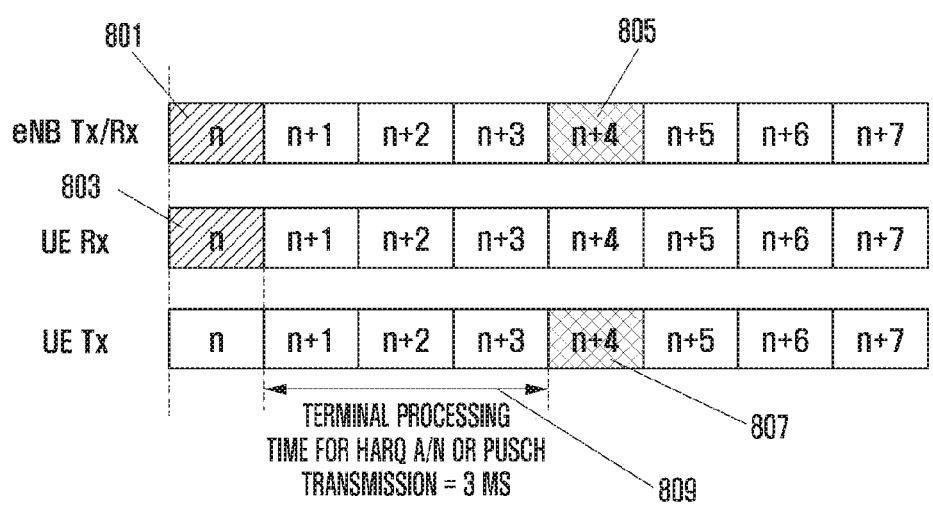
FIG. 8 is a diagram illustrating the transmission and reception timings of a first signal and a second signal of a base station and a terminal in case where a transfer delay time is 0 in an LTE or LTE-A system.

FIG. 8 is a diagram illustrating the timing of a base station and a terminal in a FDD LTE system if uplink scheduling is granted and uplink data is transmitted or if downlink data is received and HARQ ACK or NACK is transferred.

Referring to FIG. 8, if the base station transmits an uplink scheduling grant or a downlink control signal and data to a terminal in the subframe n 801, the terminal receives the uplink scheduling grant or the downlink control signal and the data in the subframe n 803.

On the other hand, in case of receiving the uplink scheduling grant in the subframe n 803, the terminal transmits uplink data in the subframe n+4 807. Further, in case of receiving the downlink control signal and the data in the subframe n 803, the terminal transmits the HARQ ACK or NACK for the downlink data in the subframe n+4 807. Accordingly, the processing time in which the terminal receives the uplink scheduling grant and transmits the uplink data or the terminal receives the downlink data and transfers the HARQ ACK or NACK becomes 3 ms corresponding to three subframes (809).

On the other hand, since the terminal is generally located far apart from the base station, a signal transmitted by the terminal is received in the base station after a propagation delay time. The propagation delay time may be considered as a value obtained by dividing a path in which radio waves propagate from the terminal to the base station by the speed of light, and in general, it may be considered as a value obtained by dividing a distance from the terminal to the base station by the speed of light. As an example, if the terminal is located 100 km apart from the base station, a signal transmitted by the terminal is received in the base station after about 0.34 ms. In contrast, a signal transmitted by the base station is received in the terminal after about 0.34 ms.

As described above, the time in which the signal transmitted by the terminal arrives at the base station may differ depending on the distance between the terminal and the base station. Accordingly, if several terminals existing in different locations simultaneously transmit signals to the base station, times in which the base station receives the signals may differ from each other. To solve such a phenomenon, a method for slightly changing the signal transmission times of the terminals in accordance with the locations of the terminals may be considered in order for the signals transmitted from the several terminals to be simultaneously received in the base station. Here, information related to the slight changes of the signal transmission times of the respective terminals may be called timing advance in the LTE system.

In the LTE system, the terminal transmits a RACH signal or a preamble to the base station in order to perform a random access (RA), and the base station calculates the timing advance values required for uplink synchronization of the terminals and transfers the resultant timing advance value of 11 bits to the terminal through a random access response.

The terminal matches uplink synchronization using the transferred timing advance value. Thereafter, the base station continuously measures the timing advance value that is additionally required by the terminal for the uplink synchronization of the terminal to transfer the measured value to the terminal. The additional timing advance value is composed of 6 bits, and is transferred through a MAC control element (CE). The terminal adjusts the timing advance value by adding the transferred additional timing advance value of 6 bits to the timing advance value that has already been applied.

Figure 9:
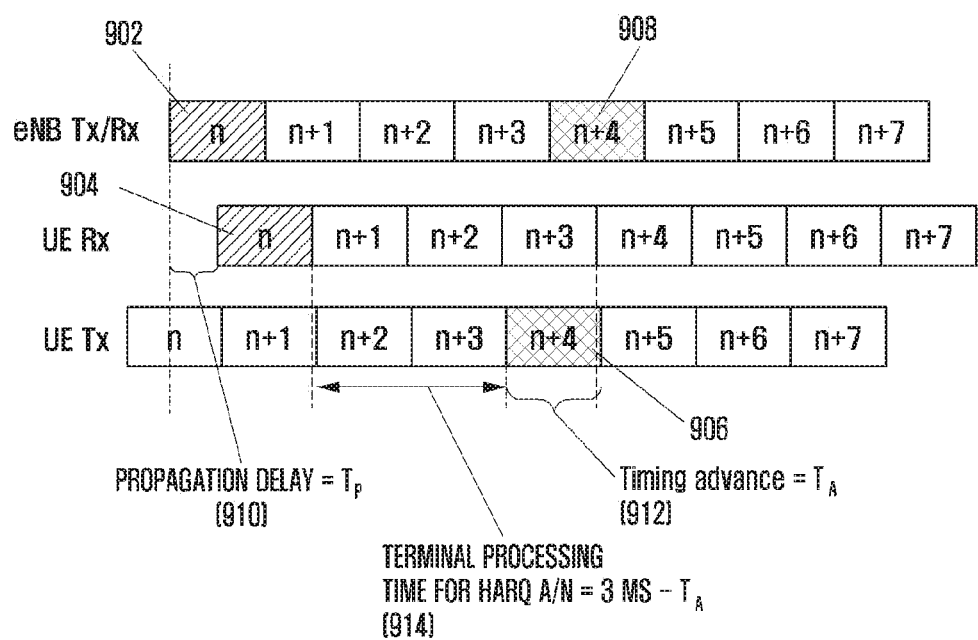
FIG. 9 is a diagram illustrating the transmission and reception timings of a first signal and a second signal of a base station and a terminal in case where a transfer delay time is longer than 0 and a timing advance is applied in an LTE or LTE-A system.

FIG. 9 is a diagram illustrating the timing relationship in accordance with the timing advance according to a distance between a terminal and a base station in a FDD LTE system if the terminal receives an uplink scheduling grant and transmits uplink data or if the terminal receives downlink data and transfers HARQ ACK or NACK.

If the base station transmits the uplink scheduling grant or a downlink control signal and data to the terminal in the subframe n 902, the terminal receives the uplink scheduling grant or the downlink control signal and the data in the subframe n 904. In this case, the terminal receives the uplink scheduling grant or the downlink control signal later than the time when the signal is transmitted by the base station for a propagation delay time $T_P$ 910.

First, as an example, in case of receiving the uplink scheduling grant in the subframe n 904, the terminal transmits uplink data in the subframe n+4 906.

Further, in case of receiving the downlink control signal and the data in the subframe n 904, the terminal transmits the HARQ ACK or NACK for the downlink data in the subframe n+4 906.

Even in case of transmitting the signal to the base station, the terminal transmits the HARQ ACK/NACK for the uplink data or the downlink data in the timing 906 that is earlier than the subframe n+4 based on the signal received by the terminal for $T_A$ 912 so that the signal is received in the base station at a specific time.

Accordingly, the processing time in which the terminal receives the uplink scheduling grant and transmits the uplink data or the terminal receives the downlink data and transfers the HARQ ACK or NACK becomes a time obtained by excluding the $T_A$ from 3 ms corresponding to three subframes (914). The time (3 ms–$T_A$) is based on the LTE system in the related art having TTI of 1 ms, and in case where the TTI length is shortened and the transmission timing is changed, the time (3 ms–$T_A$) may be changed to another value.

The base station calculates an absolute value of the TA of the corresponding terminal. When the terminal performs an initial access, the base station may calculate the absolute value of the TA by adding/subtracting a variation of the TA value transferred through higher signaling to/from the TA value firstly transferred to the terminal at the random access operation.

In the disclosure, the absolute value of the TA may be a value obtained by subtracting a start time of the n-th TTI received by the terminal from a start time of the n-th TTI transmitted by the terminal.

On the other hand, one important performance basis of a wireless cellular communication system is packet data latency. For this, in the LTE system, signal transmission/reception is performed in the unit of a subframe having a transmission time interval (TTI) of 1 ms. The LTE system operating as described above may support the terminal (short-TTI UE) having a transmission time interval that is shorter than 1 ms.

On the other hand, in an NR that is the 5G mobile communication system, the transmission time interval may be shorter than 1 ms. It is expected that the short-TTI UE is suitable to a voice over LTE (VoLTE) service in which the latency is important) or a service such as remote control. Further, the short-TTI UE is expected as means for realizing cellular-based mission-critical Internet of things (IoT).

Figure 10:
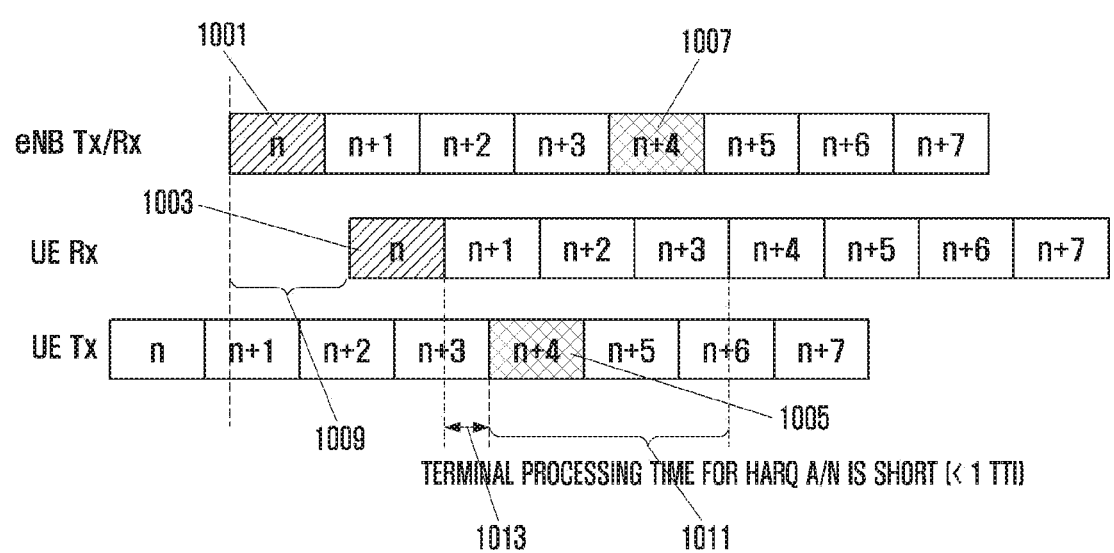
FIG. 10 is a diagram illustrating the transmission and reception timings of a first signal and a second signal of a base station and a terminal in case where a transfer delay time is longer than 0 and a timing advance is applied in an LTE or LTE-A system.

The processing time (3 ms–$T_A$) in which the terminal processes a transmitted signal as illustrated in FIG. 9 may be changed as in FIG. 10 in case of the short-TTI UE or in case of the terminal having a large absolute value 511 of the $T_A$.

FIG. 10 is another diagram illustrating the timing relationship in accordance with the timing advance according to a distance between a terminal and a base station in a FDD LTE system if the terminal receives an uplink scheduling grant and transmits uplink data or if the terminal receives downlink data and transfers HARQ ACK or NACK.

For example, if the uplink scheduling grant is transmitted at the n-th TTI 1001 and 1003, and the corresponding uplink data is transmitted at the (n+4)-th TTI 1005 and 1007, (3TTIs−$T_A$) 1013 may be the processing time of the terminal.

If the TTI length is shorter than 1 ms, and the distance between the terminal and the base station is long to cause the TA to be large, the processing time (3TTIs−$T_A$) 1013 of the terminal may become smaller or even may become a negative number.

In order to solve this problem, the maximum TA value assumed by the terminal for the short-TTI operation may be separately determined. The maximum TA value for the short-TTI operation is smaller than the maximum TA value in the LTE system in the related art, and may be a value that is optionally assumed to determine the terminal support capability without being determined between the base station and the terminal. Accordingly, there is a need for a method in which the terminal supporting the short-TTI operation operates in case where the TA that exceeds the maximum TA value for the short-TTI operation and a method in which the terminal transfers to the base station information on whether the short-TTI operation is possible.

On the other hand, in the NR system as described above, supported services may be divided into categories, such as enhanced mobile broadband (eMBB), massive machine type communications (mMTC), and ultra-reliable and low-latency communications (URLLC). The eMBB may be a service that takes aim at high-speed transmission of high-capacity data, the mMTC may be a service that takes aim at terminal power minimization and plural terminal connection, and the URLLC may be a service that takes aim at high reliability and low latency. Different requirements may be applied in accordance with the type of services applied to the terminal.

For example, in accordance with the type of services, different operations may be performed within a predetermined processing time, and in case of a service supporting the URLLC, it may be important to perform a determined operation in a short time since low latency is important. As described above, in accordance with the type of services given to the terminal, restrictions on the TA values required by the terminal may differ. That is, it may be specified that the terminal assumes different maximum TA values for respective services, or the terminal may assume the same maximum TA value even if the services are different from each other.

Hereinafter, embodiments of the disclosure will be described in detail with reference to the accompanying drawings. In describing the disclosure, a detailed description of related functions or configurations will be omitted if it is determined that it obscures the disclosure in unnecessary detail. Further, all terms used in the description are general terms that are widely used in consideration of their functions in the disclosure, but may differ depending on intentions of a person skilled in the art to which the disclosure belongs, customs, or appearance of new technology. Accordingly, they should be defined based on the contents of the whole description of the disclosure. Hereinafter, the base station is the subject that performs resource allocation to the terminal, and may be at least one of an eNode B, Node B, base station (BS), radio access unit, base station controller, and node on a network. The terminal may include user equipment (UE), mobile station (MS), cellular phone, smart phone, computer, or multimedia system that can perform a communication function. In the disclosure, a downlink (DL) is a radio transmission path of a signal that is transmitted from the base station to the terminal, and an uplink (UL) means a radio transmission path of a signal that is transmitted from the terminal to the base station. Further, although an LTE or LTE-A system is hereinafter exemplified in explaining an embodiment of the disclosure, the embodiment of the disclosure may be applied to even other communication systems having similar technical backgrounds or channel types. For example, the 5G mobile communication technology (5G or new radio (NR)) developed after LTE-A may be included therein. Further, the embodiment of the disclosure may also be applied to other communication systems through partial modifications thereof in a range that does not greatly deviate from the scope of the disclosure through the judgment of those skilled in the art.

Hereinafter, unless specially mentioned, a shortened-TTI terminal to be described may be called a first type terminal, and a normal-TTI terminal may be called a second type terminal. The first type terminal may include control information, data, or a terminal capable of transmitting the control information and the data at a transmission time interval of 1 ms or shorter than 1 ms, and the second type terminal may include control information, data, or a terminal capable of transmitting the control information and the data at a transmission time interval of 1 ms.

Hereinafter, the shortened-TTI terminal and the first type terminal are mixedly used, and the normal-TTI terminal and the second type terminal are mixedly used. Further, in the disclosure, shortened-TTI, shorter-TTI, shortened TTI, shorter TTI, short TTI, and sTTI have the same meaning, and may be mixedly used. Further, in the disclosure, normal-TTI, normal TTI, subframe TTI, and legacy TTI have the same meaning, and may be mixedly used.

Hereinafter, a shortened-TTI transmission may be called a first type transmission, and a normal-TTI transmission may be called a second type transmission. The first type transmission is a method in which a control signal, a data signal, or both the control signal and the data signal are transmitted in an interval that is shorter than 1 ms, and the second type transmission is a method in which the control signal, the data signal, or both the control signal and the data signal are transmitted in an interval of 1 ms.

Hereinafter, the shortened-TTI transmission and the first type transmission are mixedly used, and the normal-TTI transmission and the second type transmission are mixedly used. The first type terminal may support both the first type transmission and the second type transmission, or may support only the first type transmission. The second type terminal supports the second type transmission, but is unable to support the first type transmission. In the disclosure, for convenience, "for the first type terminal" may be interpreted as "for first type transmission".

If the normal-TTI and a longer-TTI exist instead of the shortened-TTI and the normal-TTI, the normal-TTI transmission may be called the first type transmission, and the longer-TTI transmission may be called the second type transmission. In the disclosure, a first type reception and a second type reception may be processes of receiving a signal transmitted in accordance with the first type and a signal transmitted in accordance with the second type.

In the disclosure, the transmission time interval in the downlink may mean a unit in which a control signal and a data signal are transmitted or a unit in which the data signal is transmitted.

For example, in the downlink of the LTE system in the related art, the transmission time interval becomes a subframe that is a time unit of 1 ms. On the other hand, in the disclosure, the transmission time interval in the uplink may mean a unit in which the control signal and the data signal are transmitted or a unit in which the data signal is transmitted. In the uplink in the LTE system in the related art, the transmission time interval is a subframe that is a time unit of 1 ms and is the same as that in the downlink.

Further, in the disclosure, the shortened-TTI mode corresponds to a case where the terminal or the base station transmits and receives a control signal or a data signal in the unit of a shortened TTI, and the normal-TTI mode corresponds to a case where the terminal or the base station transmits and receives the control signal or the data signal in the unit of a subframe.

Further, in the disclosure, the shortened-TTI data means data transmitted from the PDSCH or PUSCH that is transmitted and received in the unit of a shortened TTI, and the normal-TTI data means data transmitted from the PDSCH or PUSCH that is transmitted and received in the unit of a subframe.

In the disclosure, the control signal for the shortened-TTI means a control signal for the shortened-TTI mode operation, and hereinafter is defined as sPDCCH. Further, the control signal for the normal-TTI means a control signal for the normal-TTI mode operation. As an example, the control signal for the normal-TTI may be a PCFICH, PHICH, PDCCH, EPDCCH, or PUCCH in the LTE system in the related art.

In the disclosure, the terms "physical channel" and "signal" in the LTE or LTE-A system in the related art may be mixedly used with data or a control signal. For example, although the PDSCH is a physical channel through which the normal-TTI data is transmitted, it may be normal-TTI data in the disclosure. Further, although the sPDSCH is a physical channel through which the shortened-TTI data is transmitted, it may be shortened-TTI data in the disclosure. Similarly, in the disclosure, the shortened-TTI data transmitted on the downlink and the uplink may be called sPDSCH and sPUSCH.

As described above, the disclosure proposes a detailed method for defining transmission and reception operations of the shortened-TTI terminal and the base station and operating both the existing terminal and the shortened-TTI terminal in the same system. In the disclosure, the normal-TTI terminal indicates a terminal that transmits and receives control information and data information in the unit of 1 ms or in the unit of a subframe. The control information for the normal-TTI terminal is carried and transmitted on the PDCCH that is mapped to 3 OFDM symbols at maximum in one subframe, or is carried and transmitted on the EPDCCH that is mapped to a specific resource block in the whole subframe. The shortened-TTI terminal indicates a terminal that performs transmission and reception in the unit of a subframe like the normal-TTI terminal or in the unit that is smaller than the subframe. Further, the shortened-TTI terminal may be a terminal supporting only transmission and reception in the unit that is smaller than the subframe.

Hereinafter, in the disclosure, an uplink scheduling grant signal and a downlink data signal are called a first signal. Further, in the disclosure, an uplink data signal for the uplink scheduling grant and the HARQ ACK/NACK for the downlink data signal are called a second signal. In the disclosure, a signal that expects a response from the terminal among signals that the base station transmits to the terminal may be the first signal, and the response signal of the terminal corresponding to the first signal may be the second signal. Further, in the disclosure, the service types of the first signal may belong to categories, such as enhanced mobile broadband (eMBB), massive machine type communications (mMTC), and ultra-reliable and low-latency communications (URLLC).

In the disclosure, the TTI length of the first signal means the time length in which the first signal is transmitted. Further, in the disclosure, the TTI length of the second signal means the time length in which the second signal is transmitted. Further, in the disclosure, the transmission timing of the second signal may mean information on when the terminal transmits the second signal and when the base station receives the second signal, and may be called the transmission/reception timing of the second signal.

In the disclosure, in case where a TDD system is not mentioned, it is general that the communication system is an FDD system. However, the method and apparatus according to the disclosure in the FDD system could be applied even to the TDD system through simple modification thereof.

Hereinafter, in the disclosure, higher signaling is a method for transferring a signal from the base station to the terminal using the downlink data channel of the physical layer or a method for transferring a signal from the terminal to the base station using the uplink data channel of the physical layer, and it may be mentioned as RRC signaling or a MAC control element (CE).

Hereinafter, in the disclosure, the terminal may mean the first type terminal unless separately mentioned. However, it will be apparent whether the terminal is the first type terminal or the second type terminal in accordance with front and behind contexts.

(2-1)-th Embodiment

Figure 11:
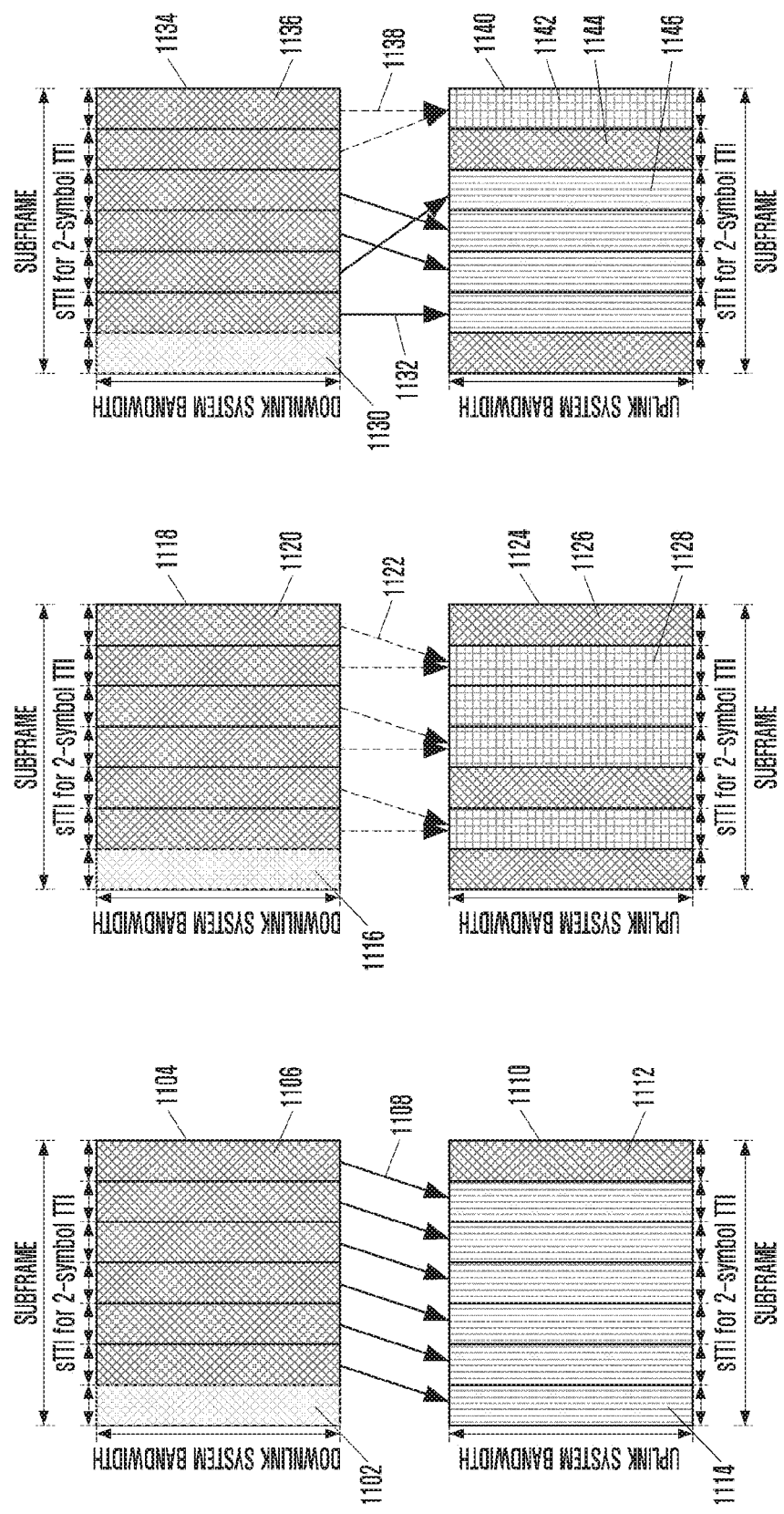
FIGS. 11A to 11C are diagrams illustrating an example in which 2-symbol TTI is used on a downlink and an uplink according to (2-1)-th embodiment of the disclosure.

With reference to FIGS. 11A to 11C, a resource mapping method between sPDSCH and HARQ ACK/NACK or between UL grant and sPUSCH in a situation where downlink TTI is composed of 2-symbol DL sTTI and uplink TTI is composed of 2-symbol UL sTTI according to the (2-1)-th embodiment will be described.

FIGS. 11A to 11C are diagrams illustrating a mapping relationship between sPDSCH and HARQ ACK/NACK or between UL grant and sPUSCH in a situation where TTIs are composed of 2-symbol DL sTTI and 2-symbol UL sTTI.

More specifically, HARQ feedback information for downlink data transmitted using 2-symbol TTI is transmitted on an uplink control channel using the 2-symbol TTI. Further, uplink data according to uplink scheduling information transmitted through a downlink control channel using the 2-symbol TTI is transmitted using the 2-symbol TTI. Hereinafter, explanation of "at which 2-symbol TTI downlink data or uplink scheduling information is transmitted in one downlink subframe and at which 2-symbol TTI a response is transmitted in one uplink subframe" will be made.

FIG. 11A is a diagram illustrating which 2-symbol UL sTTI 1110 is selected for the terminal to transmit HARQ ACK/NACK for the corresponding sPDSCH if the base station transfers sPDSCH to the terminal through 2-symbol DL sTTI 1104.

In this case, it is assumed that the difference between the first sTTI 1102 of 2-symbol DL sTTI 1104 and the first sTTI 1114 of the subsequent 2-symbol UL sTTI 1110 corresponds to n sTTIs. That is, it is assumed that the first sTTI 1114 of the 2-symbol UL sTTI 1110 comes out after n sTTIs after the first sTTI 1102 of the 2-symbol DL sTTI 1104 occurs.

In this case, HARQ ACK/NACK for sPDSCH transmitted at the second sTTI of the 2-symbol DL sTTI 1104 can be reported at the first sTTI of the 2-symbol UL sTTI 1110 that is after (n−1) sTTIs.

In FIG. 11A, it is assumed that the existing PDCCH uses the first 2 symbols. In this situation, the first sPDSCH is transmitted at the second sTTI of the 2-symbol DL sTTI 1104. As assumed in FIG. 11A, symbol length 2 occupied by the existing PDCCH and HARQ ACK/NACK timing n−1 for sPDSCH can be flexibly changed in accordance with the corresponding system operation. As an example, in case of symbol length 1 occupied by the existing PDCCH, the first sPDSCH may be transmitted at the first sTTI of the 2-symbol DL sTTI 1104, and HARQ ACK/NACK timing for the corresponding sPDSCH may be defined as n+k.

In this case, in FIG. 11A, the same value may be given to all the HARQ ACK/NACK timings for sPDSCH used at the corresponding 2-symbol DL sTTI 1104. The corresponding timing value may be a constant value regardless of the system operation, or may be semi-statically or dynamically changed. In case where the timing value is semi-statically or dynamically changed, the base station may notify the terminal of the timing value through sPDCCH belonging to the 2-symbol DL sTTI 1104 or the existing PDCCH, or through higher signaling.

Further, in addition to the operation of transmitting HARQ ACK/NACK for sPDSCH received by the terminal, the above-described operation may be applied to an operation in which the base station transmits UL grant to the terminal through sPDCCH belonging to 2-symbol DL sTTI 1104 or the existing PDCCH, and the terminal receives the UL grant and transmits sPUSCH at 2-symbol UL sTTI 1110 occurring after (n+k) sTTIs.

FIG. 11B illustrates a method in which the base station transfers a plurality of sPDSCHs to one terminal at 2-symbol DL sTTI 1118, and the terminal performs bundling (1122) of HARQ ACK/NACK for the plurality of sPDSCHs at one sTTI of 2-symbol UL sTTI 1124 and reports the same to the base station (1128).

Further, FIG. 11B illustrates a method in which the base station transfers a plurality of sPDSCHs to one terminal or to respective terminals one by one, and the terminal multiplexes (1122) the corresponding HARQ ACK/NACK at one sTTI of 2-symbol UL sTTI 1124 and reports the same to the base station (1128).

As an example, in FIG. 11B, the terminal may perform HARQ ACK/NACK report for sPDSCHs of the second and third sTTIs of 2-symbol DL sTTI 1118 at the second sTTI of 2-symbol UL sTTI 1124. Further, the terminal may perform HARQ ACK/NACK report for sPDSCHs of the fourth and fifth sTTIs at the fourth sTTI of 2-symbol UL sTTI 1124. Further, the terminal may perform HARQ ACK/NACK report for sPDSCHs of the sixth and seventh sTTIs at the sixth sTTI of 2-symbol UL sTTI 1124.

As another method different from the above-described example, the HARQ ACK/NACK report for n sPDSCHs transmitted at n sTTIs of 2-symbol DL sTTI 1118 may be bundled or multiplexed to be transmitted at one sTTI of 2-symbol UL sTTI 1124 after the k-th sTTI. The corresponding timing value may be a constant value regardless of the system operation, or may be semi-statically or dynamically changed. In case where the timing value is semi-statically or dynamically changed, the base station may notify the terminal of the timing value through sPDCCH belonging to the 2-symbol DL sTTI 1118 or the existing PDCCH, or through higher signaling.

Further, in addition to the operation of transmitting HARQ ACK/NACK for sPDSCH received by the terminal, the above-described operation may be applied to an operation in which the base station transmits UL grants to a plurality of terminals through several sPDCCHs or the existing PDCCHs at 2-symbol DL sTTI 1118, and the corresponding terminals receive the UL grants and multiplex and transmit sPUSCHs of the corresponding terminals at 2-symbol UL sTTI 1124 occurring after (n+k) sTTIs.

Further, in FIG. 11B, it is assumed that the symbol length for the existing PDCCH is 2. If the symbol length for the existing PDCCH is 1, it is possible to transmit sPDSCH even at the first sTTI of 2-symbol DL sTTI 1118, and it is also possible to bundle or multiplex the HARQ ACK/NACK to be reported.

FIG. 11C illustrates a method in which the method of FIG. 11A and the method of FIG. 11B are combined. That is, the terminal may report (1142) HARQ ACK/NACK at one sTTI of 2-symbol UL sTTI 1140 in a state where one part of sPDSCHs transmitted at 2-symbol DL sTTI 1134 is bundled or multiplexed (1138), and may report (1146) HARQ ACK/NACK at one sTTI of 2-symbol UL sTTI 1140 in a state where the other part is not bundled or multiplexed (1132).

Further, the HARQ ACK/NACK report for sPDSCH transmitted at 2-symbol DL sTTI 1134 can be performed in reverse order at 2-symbol UL sTTI 1140.

Such an operation can be applied if there are different requirements of sPUSCH for HARQ ACK/NACK or UL grant for different sPDSCHs transmitted through different sTTIs.

Further, when receiving the sPDSCH transmitted at one sTTI of 2-symbol DL sTTI 1134, the terminal can identify the corresponding HARQ ACK/NACK report timing on sPDCCH transmitted together with the corresponding sPDSCH or the existing PDCCH.

Further, in addition to the HARQ ACK/NACK operation for sPDSCH, the above-described operation may also be applied to an operation in which the base station transmits UL grants to a plurality of terminals through several sPDCCHs or the existing PDCCHs at 2-symbol DL sTTI 1134, and the corresponding terminals receive the UL grants and multiplex or do not multiplex sPUSCHs of the corresponding terminals to be transmitted at 2-symbol UL sTTI 1140 occurring after (n+k) sTTIs.

Further, in FIG. 11C, it is assumed that the symbol length for the existing PDCCH is 2. If the symbol length for the existing PDCCH is 1, it is possible to transmit sPDSCH even at the first sTTI of 2-symbol DL sTTI 1118, and it is also possible to bundle or multiplex or not to bundle or multiplex the HARQ ACK/NACK to be reported.

(2-2)-th Embodiment

Figure 12:
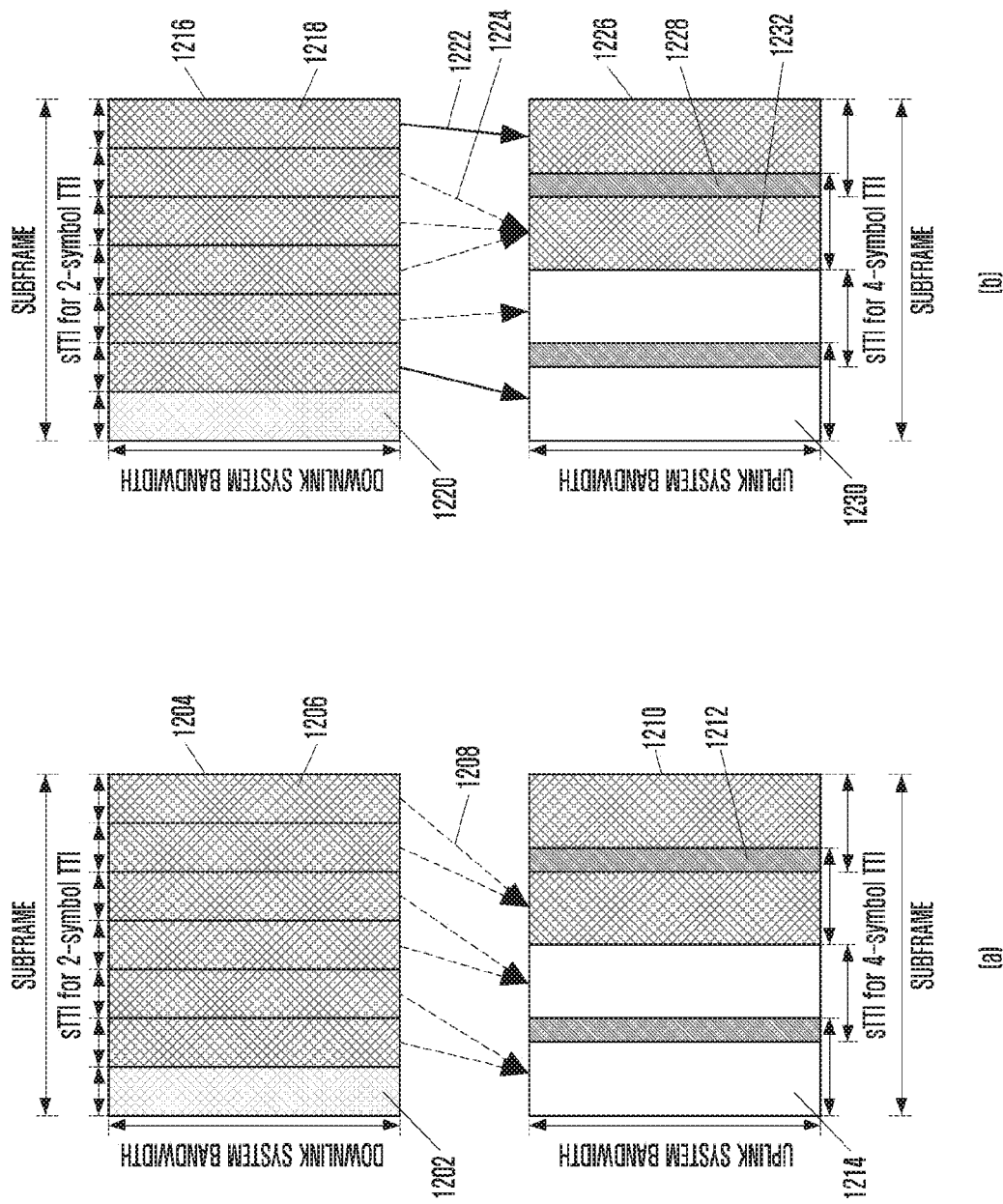
FIGS. 12A and 12B are diagrams illustrating an example in which 2-symbol TTI is used on a downlink and 4-symbol TTI is used on an uplink according to (2-2)-th embodiment of the disclosure.

With reference to FIGS. 12A and 12B, a resource mapping method between sPDSCH and HARQ ACK/NACK or between UL grant and sPUSCH in a situation where downlink TTI is composed of 2-symbol DL sTTI and uplink TTI is composed of 4-symbol UL sTTI according to the (2-2)-th embodiment will be described.

FIGS. 12A and 12B are diagrams illustrating a mapping relationship between sPDSCH and HARQ ACK/NACK or between UL grant and sPUSCH in a situation where TTIs are composed of 2-symbol DL sTTI and 4-symbol UL sTTI.

More specifically, HARQ feedback information for downlink data transmitted using 2-symbol TTI is transmitted on an uplink control channel using the 4-symbol TTI. Further, uplink data according to uplink scheduling information transmitted through a downlink control channel using the 2-symbol TTI is transmitted using the 4-symbol TTI. Hereinafter, explanation of "at which 2-symbol TTI downlink data or uplink scheduling information is transmitted in one downlink subframe and at which 4-symbol TTI a response is transmitted in one uplink subframe" will be made.

In FIG. 12A, the base station transfers a plurality of sPDSCHs to one terminal at 2-symbol DL sTTI 1204, and the terminal performs bundling (1208) of HARQ ACK/NACK for the plurality of sPDSCHs at one sTTI of 4-symbol UL sTTI 1210 and reports the same to the base station (1214).

Further, in a situation where the base station transfers a plurality of sPDSCHs to one terminal or to respective terminals one by one, the terminal multiplexes (1208) the corresponding HARQ ACK/NACK at one sTTI of 4-symbol UL sTTI 1210 and reports the same to the base station (1214).

In this case, it is assumed that the difference between the first sTTI 1202 of 2-symbol DL sTTI 1204 and the first sTTI 1214 of the subsequent 4-symbol UL sTTI 1210 corresponds to n sTTIs. That is, it is assumed that the first sTTI 1214 of the 4-symbol UL sTTI 1210 comes out after n sTTIs after the first sTTI 1202 of the 2-symbol DL sTTI 1204 occurs.

In this case, HARQ ACK/NACK for sPDSCH transmitted at the second sTTI of the 2-symbol DL sTTI 1204 can be reported at the first sTTI 1214 of the 4-symbol UL sTTI 1210 that is after (n−1) sTTIs. Here, 4-symbol UL sTTI length is twice 2-symbol DL sTTI length, and on the assumption that the sTTI length is suited based on the 2-symbol DL sTTI, it is considered that the difference between the first sTTI of 4-symbol UL sTTI 1210 and the first sTTI 1202 of 2-symbol DL sTTI 1204 corresponds to n sTTIs, and the difference between the second sTTI of 4-symbol UL sTTI 1210 and the first sTTI 1202 of 2-symbol DL sTTI 1204 corresponds to (n+2) sTTIs.

In this embodiment, the number of 4-symbol UL sTTIs 1210 is 4 in total in one subframe, and two 4-symbol UL sTTIs share one symbol (1212). In this case, the corresponding shared symbol may be used as a demodulation reference signal (DM-RS) for decoding sPUSCH or sPUCCH transmitted a 4-aymbol UL sTTI.

In FIG. 12A, HARQ ACK/NACK for the second and third sPDSCHs of 2-symbol DL sTTI 1204 is reported in the form in which the HARQ ACK/NACK is bundled or multiplexed at the first sTTI of 4-symbol UL sTTI 1210, and HARQ ACK/NACK for the fourth and fifth sPDSCHs is reported in the form in which the HARQ ACK/NACK is bundled or multiplexed at the second sTTI of 4-symbol UL sTTI 1210. Further, HARQ ACK/NACK for the sixth and seventh sPDSCHs is reported in the form in which the HARQ ACK/NACK is bundled or multiplexed at the third sTTI of 4-symbol UL sTTI 1210.

On the other hand, the disclosure can be configured in another method different from that in the drawing for explanation of the embodiment. For example, the terminal may report the HARQ ACK/NACK for the second and third sPDSCHs of 2-symbol DL sTTI 1204 in the form in which the HARQ ACK/NACK is bundled or multiplexed at the second sTTI of 4-symbol UL sTTI 1210. In this case, in FIG. 12A, the number of sPDSCHs for HARQ ACK/NACK bundling or multiplexing applied at one 4-symbol UL sTTI 1210 may be 2 or a certain constant value.

Further, in addition to the operation of transmitting HARQ ACK/NACK for sPDSCH received by the terminal, the above-described operation may be applied to an operation in which the base station transmits UL grants to a plurality of terminals through several sPDCCHs or the existing PDCCHs at 2-symbol DL sTTI 1204, and the corresponding terminals receive the UL grants and multiplex and transmit sPUSCHs of the corresponding terminals at 4-symbol UL sTTI 1214 occurring after (n+k) sTTIs.

Further, in FIG. 12A, it is assumed that the symbol length for the existing PDCCH is 2. If the symbol length for the existing PDCCH is 1, it is possible to transmit sPDSCH even at the first sTTI of 2-symbol DL sTTI 1204, and it is also possible to bundle or multiplex the HARQ ACK/NACK to be reported. The timing value of sPUSCH for HARQ ACK/NACK or UL grant for the sPDSCH may be a constant value regardless of the system operation, or may be semi-statically or dynamically changed. In case where the timing value is semi-statically or dynamically changed, the base station may notify the terminal of the timing value through sPDCCH belonging to the 2-symbol DL sTTI 1204 or the existing PDCCH, or through higher signaling.

FIG. 12B illustrates a method in which the terminal reports (1232) HARQ ACK/NACK at one sTTI of 4-symbol UL sTTI 1226 in a state where one part of sPDSCHs transmitted at 2-symbol DL sTTI 1216 is bundled or multiplexed (1224), and may report (1230) HARQ ACK/NACK at one sTTI of 4-symbol UL sTTI 1226 in a state where the other part is not bundled or multiplexed (1222).

Further, the HARQ ACK/NACK report for sPDSCH transmitted at 2-symbol DL sTTI 1216 can be performed in reverse order at 4-symbol UL sTTI 1226.

Such an operation can be applied if there are different requirements of sPUSCH for HARQ ACK/NACK or UL grant for different sPDSCHs transmitted through different sTTIs.

Further, when receiving the sPDSCH transmitted at one sTTI of 2-symbol DL sTTI 1216, the terminal can identify the corresponding HARQ ACK/NACK report timing on sPDCCH transmitted together with the corresponding sPDSCH or the existing PDCCH. Further, in addition to the HARQ ACK/NACK operation for sPDSCH, the above-described operation may also be applied to an operation in which the base station transmits UL grants to a plurality of terminals through several sPDCCHs or the existing PDCCHs at 2-symbol DL sTTI 1216, and the corresponding terminals receive the UL grants and multiplex or do not multiplex sPUSCHs of the corresponding terminals to be transmitted at 4-symbol UL sTTI 1226 occurring after (n+k) sTTIs.

Further, in FIG. 12B, it is assumed that the symbol length for the existing PDCCH is 2. If the symbol length for the existing PDCCH is 1, it is possible to transmit sPDSCH even at the first sTTI of 2-symbol DL sTTI 1216, and it is also possible to bundle or multiplex or not to bundle or multiplex the HARQ ACK/NACK to be reported.

(2-3)-th Embodiment

Figure 13:
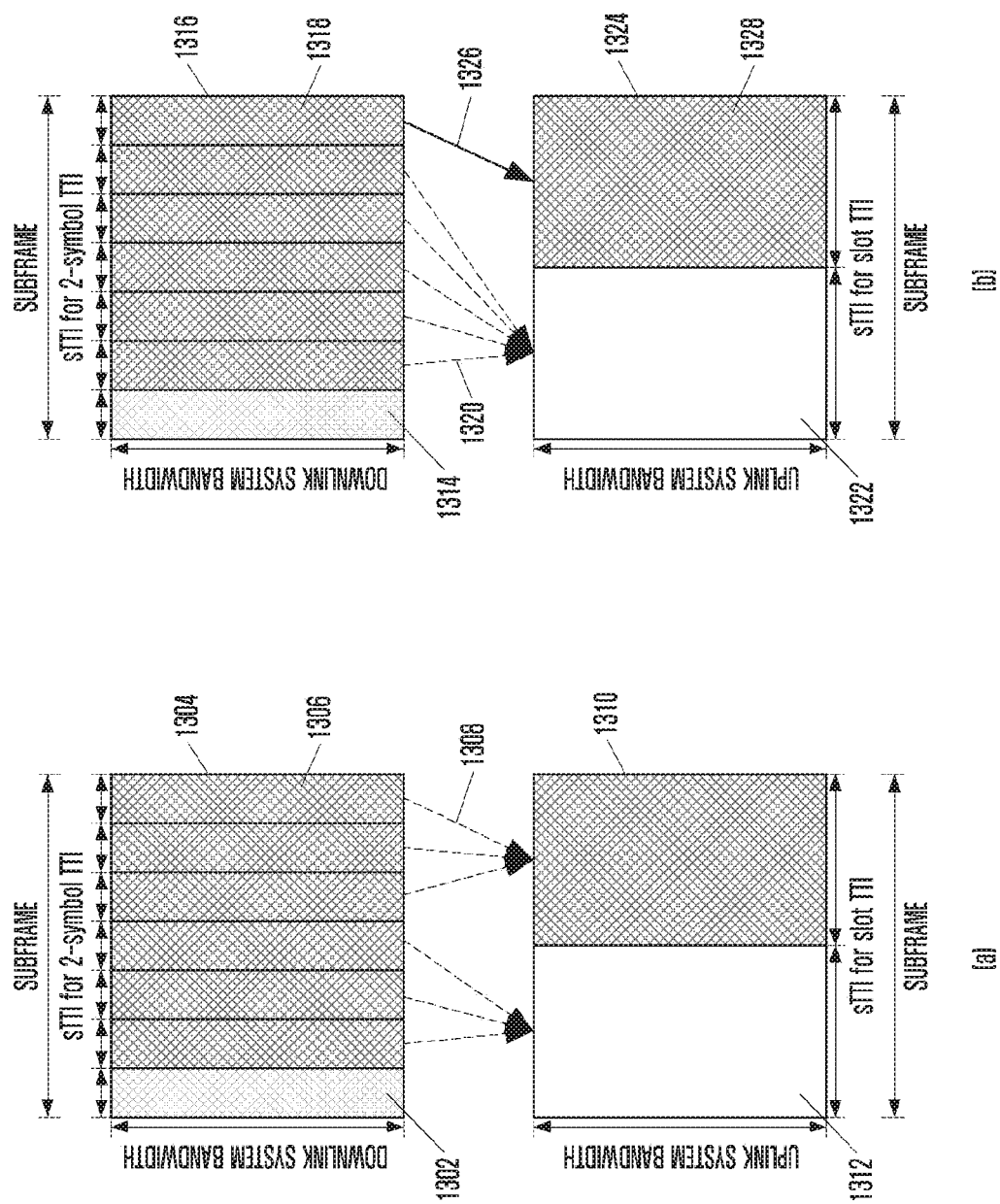
FIGS. 13A and 13B are diagrams illustrating an example in which 2-symbol TTI is used on a downlink and 7-symbol (or slot) TTI is used on an uplink according to (2-3)-th embodiment of the disclosure.

With reference to FIGS. 13A and 13B, a resource mapping method between sPDSCH and HARQ ACK/NACK or between UL grant and sPUSCH in a situation where downlink TTI is composed of 2-symbol DL sTTI and uplink TTI is composed of slot UL sTTI according to the (2-3)-th embodiment will be described.

FIGS. 13A and 13B are diagrams illustrating a mapping relationship between sPDSCH and HARQ ACK/NACK or between UL grant and sPUSCH in a situation where TTIs are composed of 2-symbol DL sTTI and slot UL sTTI.

More specifically, HARQ feedback information for downlink data transmitted using 2-symbol TTI is transmitted on an uplink control channel using the 7-symbol TTI, that is, slot TTI. Further, uplink data according to uplink scheduling information transmitted through a downlink control channel using the 2-symbol TTI is transmitted using the slot TTI. Hereinafter, explanation of "at which 2-symbol TTI downlink data or uplink scheduling information is transmitted in one downlink subframe and at which slot TTI a response is transmitted in one uplink subframe" will be made.

In FIG. 13A, the base station transfers a plurality of sPDSCHs to one terminal at 2-symbol DL sTTI 1304, and the terminal performs bundling (1308) of HARQ ACK/NACK for the plurality of sPDSCHs at one sTTI of slot UL sTTI 1310 and reports the same to the base station (1312).

Further, in a situation where the base station transfers a plurality of sPDSCHs to one terminal or to respective terminals one by one, the terminal multiplexes (1308) the corresponding HARQ ACK/NACK at one sTTI of slot UL sTTI 1310 and reports the same to the base station (1312).

In FIG. 13A, HARQ ACK/NACK for the second, third, and fourth sPDSCHs of 2-symbol DL sTTI 1304 is reported in the form in which the HARQ ACK/NACK is bundled or multiplexed at the first sTTI of slot UL sTTI 1310, and HARQ ACK/NACK for the fourth, fifth, and sixth sPDSCHs is reported in the form in which the HARQ ACK/NACK is bundled or multiplexed at the second sTTI of slot UL sTTI 1310. The disclosure can be configured in another method different from that in the drawing for explanation of the embodiment. For example, the terminal may report the HARQ ACK/NACK for the third, fourth, and fifth sPDSCHs of 2-symbol DL sTTI 1304 in the form in which the HARQ ACK/NACK is bundled or multiplexed at the second sTTI of slot UL sTTI 1310.

In this case, in FIG. 13A, the number of sPDSCHs for HARQ ACK/NACK bundling or multiplexing applied at one slot UL sTTI 1310 may be 3 or a certain constant value.

Further, in addition to the operation of transmitting HARQ ACK/NACK for sPDSCH received by the terminal, the above-described operation may be applied to an operation in which the base station transmits UL grants to a plurality of terminals through several sPDCCHs or the existing PDCCHs at 2-symbol DL sTTI 1304, and the corresponding terminals receive the UL grants and multiplex and transmit sPUSCHs of the corresponding terminals at one slot UL sTTI 1312 occurring after (n+k) sTTIs.

Further, in FIG. 13A, it is assumed that the symbol length for the existing PDCCH is 2. If the symbol length for the existing PDCCH is 1, it is possible to transmit sPDSCH even at the first sTTI of 2-symbol DL sTTI 1304, and it is also possible to bundle or multiplex the HARQ ACK/NACK to be reported. The timing value of sPUSCH for HARQ ACK/NACK or UL grant for the sPDSCH may be a constant value regardless of the system operation, or may be semi-statically or dynamically changed. In case where the timing value is semi-statically or dynamically changed, the base station may notify the terminal of the timing value through sPDCCH belonging to the 2-symbol DL sTTI 1304 or the existing PDCCH, or through higher signaling.

FIG. 13B illustrates a method in which the terminal reports (1322) HARQ ACK/NACK at one sTTI of slot UL sTTI 1324 in a state where one part of sPDSCHs transmitted at 2-symbol DL sTTI 1316 is bundled or multiplexed (1320), and may report (1328) HARQ ACK/NACK at one sTTI of slot UL sTTI 1324 in a state where the other part is not bundled or multiplexed (1326).

Further, the HARQ ACK/NACK report for sPDSCH transmitted at 2-symbol DL sTTI 1316 can be performed in reverse order at slot UL sTTI 1324.

Such an operation can be applied if there are different requirements of sPUSCH for HARQ ACK/NACK or UL grant for different sPDSCHs transmitted through different sTTIs.

Further, when receiving the sPDSCH transmitted at one sTTI of 2-symbol DL sTTI 1316, the terminal can identify the corresponding HARQ ACK/NACK report timing on sPDCCH transmitted together with the corresponding sPDSCH or the existing PDCCH. Further, in addition to the HARQ ACK/NACK operation for sPDSCH, the above-described operation may also be applied to an operation in which the base station transmits UL grants to a plurality of terminals through several sPDCCHs or the existing PDCCHs at 2-symbol DL sTTI 1316, and the corresponding terminals receive the UL grants and multiplex or do not multiplex sPUSCHs of the corresponding terminals to be transmitted at slot UL sTTI 1324 occurring after (n+k) sTTIs.

Further, in FIG. 13B, it is assumed that the symbol length for the existing PDCCH is 2. If the symbol length for the existing PDCCH is 1, it is possible to transmit sPDSCH even at the first sTTI of 2-symbol DL sTTI 1316, and it is also possible to bundle or multiplex or not to bundle or multiplex the HARQ ACK/NACK to be reported.

(2-4)-th Embodiment

Figure 14:
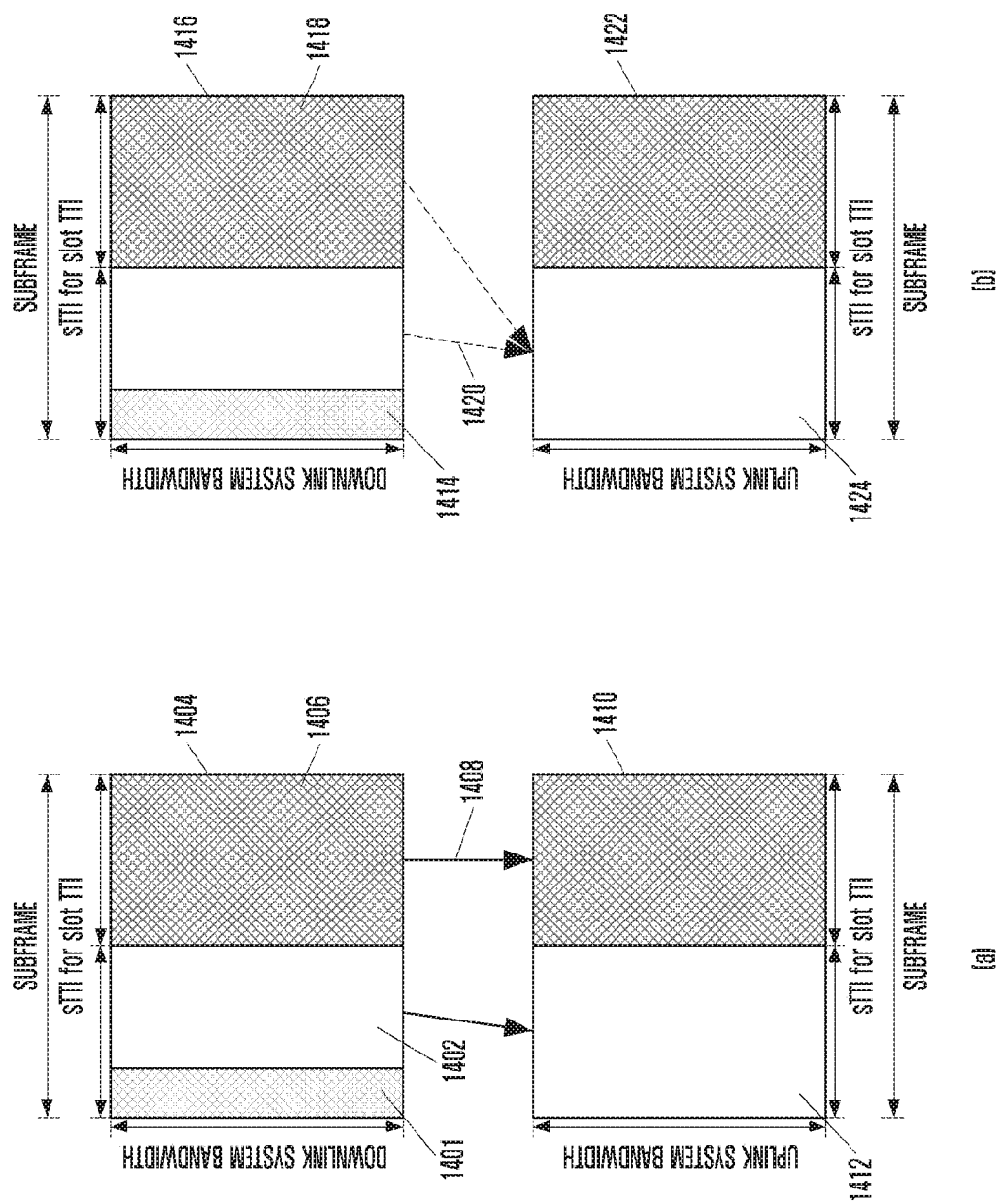
FIGS. 14A and 14B are diagrams illustrating an example in which 7-symbol (or slot) TTI is used on a downlink and an uplink according to (2-4)-th embodiment of the disclosure.

With reference to FIGS. 14A and 14B, a resource mapping method between sPDSCH and HARQ ACK/NACK or between UL grant and sPUSCH in a situation where downlink TTI is composed of slot DL sTTI and uplink TTI is composed of slot UL sTTI according to the (2-4)-th embodiment will be described.

FIGS. 14A and 14B are diagrams illustrating a mapping relationship between sPDSCH and HARQ ACK/NACK or between UL grant and sPUSCH in a situation where TTIs are composed of slot DL sTTI and slot UL sTTI.

More specifically, HARQ feedback information for downlink data transmitted using 7-symbol TTI, that is, slot TTI, is transmitted on an uplink control channel using the slot TTI. Further, uplink data according to uplink scheduling information transmitted through a downlink control channel using the slot TTI is transmitted using the slot TTI. Hereinafter, explanation of "at which slot TTI downlink data or uplink scheduling information is transmitted in one downlink subframe and at which slot TTI a response is transmitted in one uplink subframe" will be made.

FIG. 14A is a diagram illustrating a case where the base station transfers sPDSCH to the terminal through slot DL sTTI 1404, and which slot UL sTTI 1410 the terminal selects and transmits HARQ ACK/NACK for the corresponding sPDSCH.

In this case, it is assumed that the difference between the first sTTI 1402 of slot DL sTTI 1*e*04 and the first sTTI 1414 of the subsequent slot UL sTTI 1410 corresponds to n sTTIs. That is, it is assumed that the first sTTI 1412 of the slot UL sTTI 1404 comes out after n sTTIs after the first sTTI 1402 of the slot DL sTTI 1404 occurs.

In this case, HARQ ACK/NACK for sPDSCH transmitted at the first sTTI of the slot DL sTTI 1404 can be reported at the first sTTI 1412 of the slot UL sTTI 1410 that is after n sTTIs. In FIG. 14A, it is assumed that the existing PDCCH includes sPDCCH for the first slot DL sTTI. As assumed in FIG. 14A, symbol length 2 occupied by the existing PDCCH and HARQ ACK/NACK timing n for sPDSCH can be flexibly changed in accordance with the corresponding system operation.

In FIG. 14A, the same value may be given to all the HARQ ACK/NACK timings for sPDSCH used at the corresponding slot DL sTTI 1404. The corresponding timing value may be a constant value regardless of the system operation, or may be semi-statically or dynamically changed. In case where the timing value is semi-statically or dynamically changed, the base station may notify the terminal of the timing value through sPDCCH belonging to the slot DL sTTI 1404 or the existing PDCCH, or through higher signaling. Further, in addition to the HARQ ACK/NACK operation for sPDSCH, the above-described operation may be applied to an operation in which the base station transmits UL grant to the terminal through sPDCCH belonging to slot DL sTTI 1404 or the existing PDCCH, and the terminal receives the UL grant and transmits sPUSCH at slot UL sTTI 1410 occurring after (n+k) sTTIs.

FIG. 14B illustrates a method in which the terminal reports (1412) HARQ ACK/NACK for sPDSCHs transmitted at slot DL sTTI 1416 in the form in which sPDSCHs are bundled or multiplexed (1420) at one sTTI of slot UL sTTI 1422 (1424).

Further, the HARQ ACK/NACK report for sPDSCH transmitted at slot DL sTTI 1416 can be performed in reverse order at slot UL sTTI 1422.

Such an operation can be applied if there are different requirements of sPUSCH for HARQ ACK/NACK or UL grant for different sPDSCHs transmitted through different sTTIs.

Further, when receiving the sPDSCH transmitted at one sTTI of slot DL sTTI 1416, the terminal can identify the corresponding HARQ ACK/NACK report timing on sPDCCH transmitted together with the corresponding sPDSCH or the existing PDCCH. Further, in addition to the HARQ ACK/NACK operation for sPDSCH, the above-described operation may also be applied to an operation in which the base station transmits UL grants to a plurality of terminals through several sPDCCHs or the existing PDCCHs at slot DL sTTI 1416, and the corresponding terminals receive the UL grants and multiplex and transmit sPUSCHs of the corresponding terminals at slot UL sTTI 1424 occurring after (n+k) sTTIs.

In the (2-1)-th to (2-4)-th embodiments, examples of the transmission and reception method using sTTI have been described, and by easy modification in the above-described embodiments, the downlink uses slot TTI. The method can be applied to even a method in which the corresponding information is transmitted at 2-symbol TTI or 4-symbol TTI.

(2-5)-th Embodiment

With reference to FIGS. 15, 16, 17, and 18, a method for configuring information related to TTI lengths used during transmission of uplink and downlink control signals and data to a terminal according to the (2-5)-th embodiment will be described.

The base station can transmit, to the terminal, information on what TTI length is to be used in a downlink and an uplink during configuration of a first type transmission mode through higher signaling. That is, the base station can configure the TTI length to be used in the downlink to the terminal by RRC signaling through variables, such as sTTI Length DL, and in a similar manner, can configure the TTI length to be used in the uplink to the terminal by RRC signaling through variables, such as sTTI_Length_UL.

The configuration method for the downlink and the uplink may be configured by two types of variables as described above, or the downlink and uplink TTI lengths may be configured by one variable, such as sTTI_mode or sTTI_length.

Figure 15:
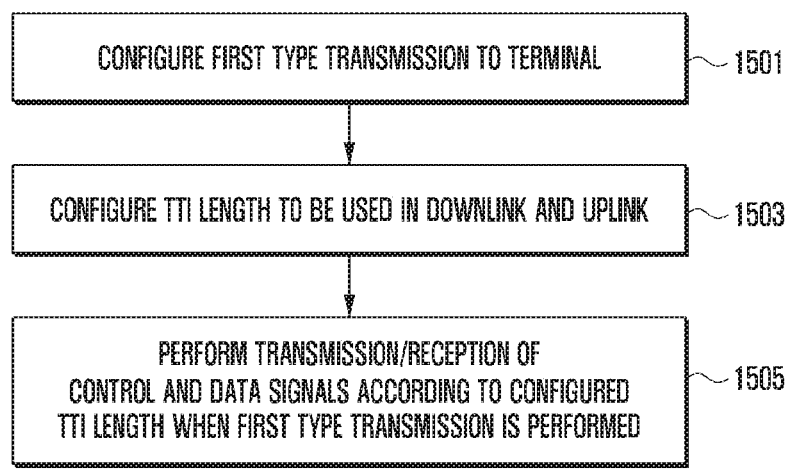
FIG. 15 is a diagram illustrating a base station procedure to configure TTI length information to be used on a downlink and an uplink by higher signaling according to (2-5)-th embodiment of the disclosure.

FIG. 15 is a diagram illustrating a base station procedure to configure TTI lengths in a method for configuring TTI length information by higher signaling.

The base station may transmit configuration of a first type transmission to the terminal (1501). The base station may additionally transmit information on the TTI length to the terminal (1503).

Thereafter, when the first type transmission is performed, the base station performs transmission/reception of a control channel or a data channel to according to the configured TTI length (1505).

Figure 16:
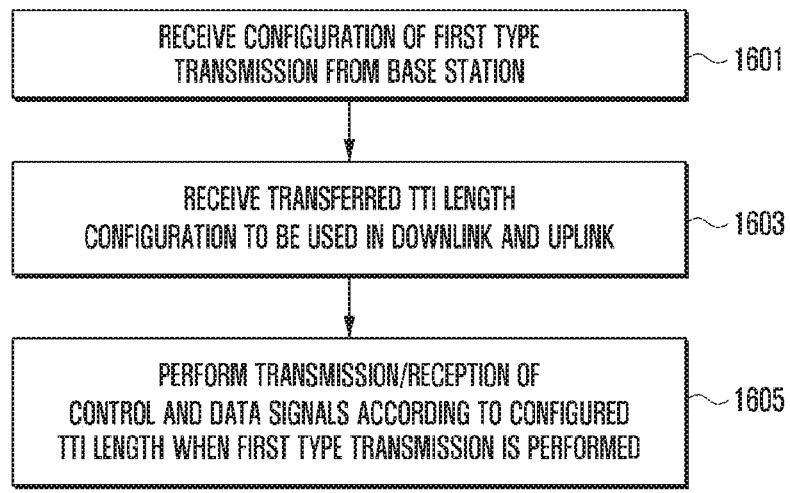
FIG. 16 is a diagram illustrating a terminal procedure to receive configuration of TTI length information to be used on a downlink and an uplink by higher signaling according to (2-5)-th embodiment of the disclosure.

FIG. 16 is a diagram illustrating a terminal procedure to receive configuration of TTI length information to be used on a downlink and an uplink by higher signaling.

The terminal may receive configuration of a first type transmission from the base station (1601).

Further, the terminal may additionally receive information on the TTI length through the configuration of the first type transmission (1603).

Thereafter, when the first type transmission is performed, the terminal performs transmission/reception of a control channel or a data channel to according to the configured TTI length (1605).

As described above, although the TTI length for the first type transmission can be transferred by higher signaling, it can be also transferred through specific bits in DCI that is downlink control information transferred on a control channel of a physical layer.

Figure 17:
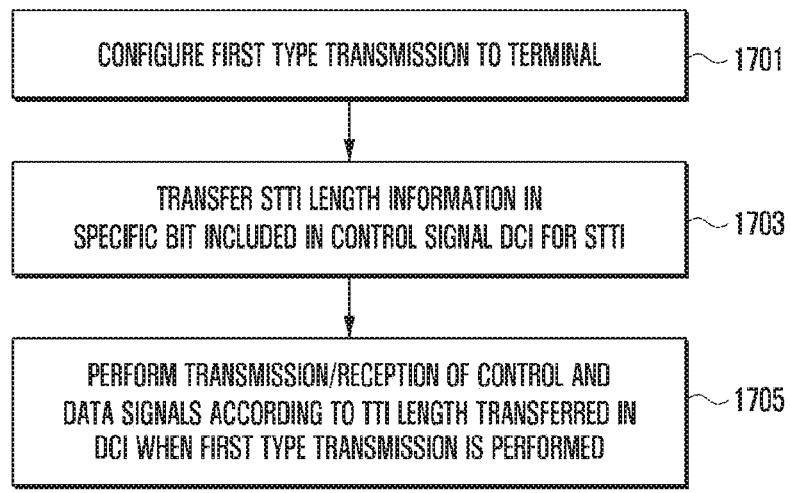
FIG. 17 is a diagram illustrating a base station procedure to transfer TTI length information to be used on a downlink and an uplink by physical layer signaling according to (2-5)-th embodiment of the disclosure.

FIG. 17 is a diagram illustrating a process in which the base station configures TTI lengths in a method for configuring TTI length information through DCI.

The base station may transmit configuration of a first type transmission to the terminal (1701).

When the control channel is transferred using the first type transmission configuration, the base station may additionally transmit information on the TTI length to the terminal (1703). The specific bits of the DCI may be one bit or more.

Thereafter, when the first type transmission is performed, the base station performs transmission/reception of a control channel or a data channel to according to the configured TTI length transferred from the DCI (1705).

Figure 18:
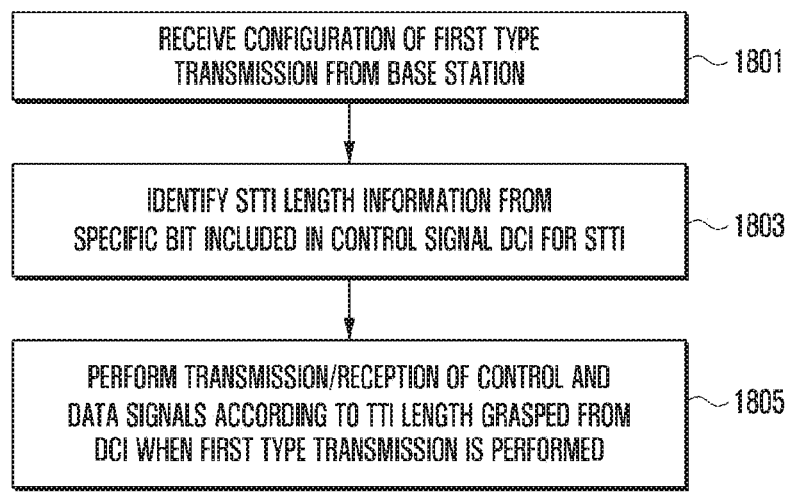
FIG. 18 is a diagram illustrating a terminal procedure to receive transferred TTI length information to be used on a downlink and an uplink by physical layer signaling according to (2-5)-th embodiment of the disclosure.

FIG. 18 is a diagram illustrating a terminal procedure to receive TTI length information in a method for transferring TTI length information through DCI.

The terminal may receive configuration of a first type transmission from the base station (1801).

When first type control channel transmission is performed by the configuration of the first type transmission, the terminal may additionally receive information on the TTI length through the DCI transferred on the control channel (1803).

Thereafter, when the first type transmission is performed, the terminal performs transmission/reception of a control channel or a data channel to according to the TTI length transferred from the specific bits in the DCI (1805).

(2-6)-th Embodiment

Figure 19:
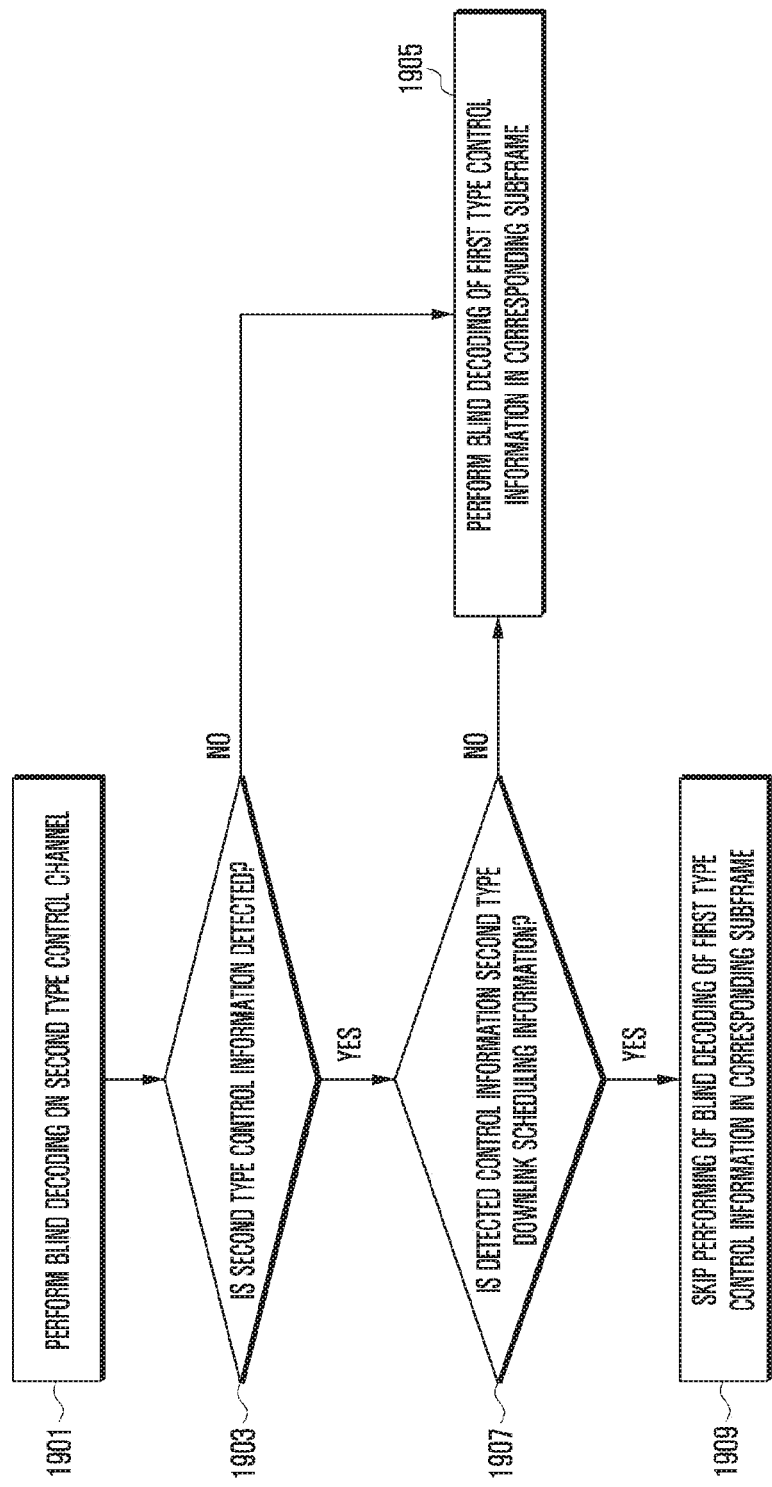
FIG. 19 is a diagram illustrating a control signal decoding method procedure for first type and second type transmission according to (2-6)-th embodiment of the disclosure.

With reference to FIG. 19, a method by a terminal capable of performing first type transmission/reception for performing decoding of a downlink control channel of a first type or second type transmission according to the (2-6)-th embodiment will be described. The terminal capable of performing the first type transmission/reception may not be configured to receive downlink control information transferred from the existing EPDCCH, or may not be configured to receive EPDCCH configuration.

The terminal capable of performing the first type transmission/reception performs blind decoding to search for DCI with respect to a second type downlink control channel UE-specifically transferred from a PDCCH region of an LTE in the related art (1901).

As a result of performing the blind decoding, the terminal can determine whether control information for second type transmission transferred to the terminal is detected (1903).

If the control information for the second type transmission is not detected, the terminal performs blind decoding of control information for first type transmission on a resource on which a control channel for first type transmission among the remaining symbols of the corresponding subframe can be transferred (1905).

If the control information for the second type transmission is detected (1907), that is, if downlink scheduling information among the control information for the second type transmission is detected (1909), the terminal receives the scheduled downlink data in the corresponding subframe, and does not perform the blind decoding of the control information for the first type transmission in the corresponding subframe (1909).

If the uplink scheduling information among the control information for the second type transmission is detected, but the downlink scheduling information is not detected, the terminal performs the blind decoding of the control information for the first type transmission in the corresponding subframe (1905).

As in the above-described embodiments, by determining whether to perform the blind decoding of the control information for the first type transmission according to circumstances, the terminal can reduce the power consumption.

(2-7)-th Embodiment

A method for mapping sPDSCH transmitted based on DMRS according to the (2-7)-th embodiment will be described.

In the disclosure, downlink and uplink data transmitted based on DMRS or a data channel may be sPDSCH and sPUSCH. Further, downlink and uplink control signals transmitted based on sTTI or a control channel may be sPDCCH and sPUCCH. Further, a set of RBs configured to transmit sPDCCH may be called a sPDCCH RB set.

The base station may configure the sPDCCH RB set that is the set of RBs to which sPDCCH transmitted to the terminal at sTTI can be mapped to the terminal, and the number of symbols included in the sPDCCH RB set may be configured as 1 symbol or 2 symbols.

The terminal may assume that sPDSCH is not transmitted in a PRB in which sPDCCH is transmitted at one sTTI. That is, in receiving and decoding sPDSCH, if sPDCCH is received in the corresponding PRB even in case where sPDSCH is allocated to be transmitted in a specific PRB through sDCI, the terminal may assume that sPDSCH is not mapped in the corresponding PRB. Further, if the corresponding PRB is configured as the sPDCCH RB set although sPDCCH is not actually mapped, the terminal expects that sPDSCH is not mapped in the corresponding PRB. The base station does not map the sPDSCH in the PRB in which the terminal expects that the sPDSCH is not mapped. Rate matching and puncturing may be used as the non-mapping method.

(2-8)-th Embodiment

A method for mapping a control signal for sTTI according to the (2-8)-th embodiment will be described.

In the disclosure, sREG may mean a set of resource elements (REs) corresponding to 12 successive subcarriers in a frequency domain.

Further, sCCE may mean a unit in which sDCI that is control information for sTTI is mapped, and may be a bundle of sREGs.

The sPDCCH RB set that the base station configures to the terminal may be composed of several RBS and one or two OFDM symbols. One or two or more sPDCCH RB sets may be configured in the same terminal, and in the sPDCCH RB set, one, two, or three OFDM symbols may be configured. Restriction of the number of OFDM symbols may differ depending on the sTTI length.

In this case, sREGs in one sPDCCH RB set may be numbered in time preference direction. That is, if two OFDM symbols are configured in the sPDCCH RB set, and 12 subcarriers of the first symbol in the lowest PRB number become sREG 0, 12 subcarriers of the second symbol in the same PRB may become sREG 1. Thereafter, 12 subcarriers of the first symbol in the next PRB become sREG 2. In this manner, sREGs can be numbered.

Thereafter, sCCE can be configured by tying sREGs as many as the number of sREGs. In this case, the sCCE number may be a value obtained by dividing the lowest sREG number among sREGs in one sCCE by the number of sREGs included in one sCCE. As an example, if 6 sREGs constitute one sCCE, the sCCE index may be sCCE index=sREG index/6. AS another example, if 4 sREGs constitute one sCCE, the sCCE index may be sCCE index=sREG index/4.

(2-9)-th Embodiment

A method for scheduling sTTI data transmission through cross-carrier scheduling according to the (2-9)-th embodiment will be described.

In the disclosure, the cross-carrier scheduling may mean that carriers transmitted by sDCI that is control information for sTTI are different from carriers transmitted by downlink data sPDSCH or sPUSCH for sTTI.

In case of the cross-carrier scheduling, if an sTTI pattern in a carrier for transmitting sDCI is different from an sTTI pattern of a carrier for transmitting sPDSCH, it is assumed that sTTI 1 of the carrier for transmitting the sPDSCH is composed of symbols 3 and 4.

That is, if the sTTI pattern in the carrier for transmitting sDCI is different from the sTTI pattern of the carrier for transmitting sPDSCH although the number of symbols occupied by [sTTI 0, sTTI 1, sTTI 2, sTTI 3, sTTI 4, sTTI 5] corresponds to [2,3,2,2,2,3], only two symbols are mapped to sPDSCH for transmitting at sTTI 1, and the 2 symbols being mapped becomes rear 2 symbols among three symbols at sTTI 1. This may be to prevent data information from being received earlier than control information in case of the cross-carrier scheduling.

As described above, 14 symbols constituting one subframe may be defined as symbol 0, symbol 1, symbol 2, symbol 3, symbol 4, symbol 5, symbol 6, symbol 7, symbol 8, symbol 9, symbol 10, symbol 11, symbol 12, and symbol 13.

Figure 20:
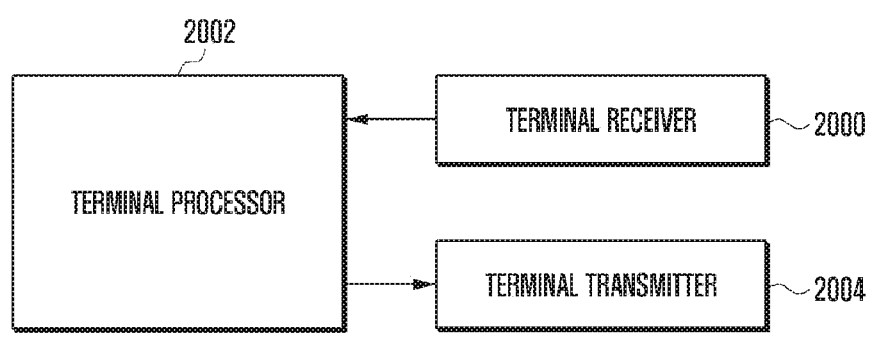
FIG. 20 is a block diagram illustrating the internal structure of a terminal according to embodiments of the disclosure.
Figure 21:
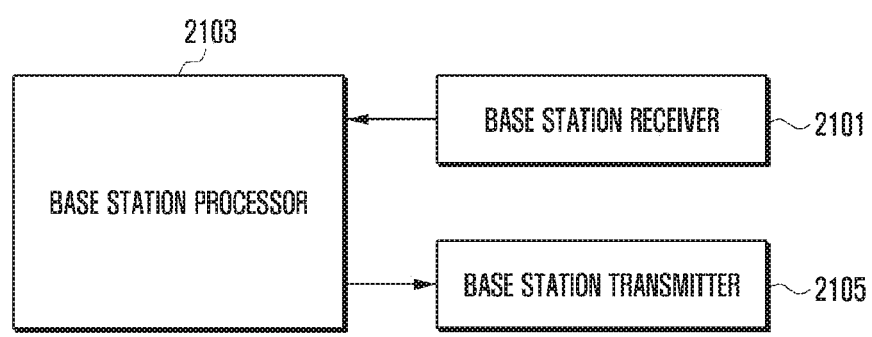
FIG. 21 is a block diagram illustrating the internal structure of a base station according to embodiments of the disclosure.

In order to perform the above-described embodiments of the disclosure, the terminal or the base station may include a transmitter, a receiver, and a processor as illustrated in FIGS. 20 and 21. In the first and second embodiments, a transmission and reception method by the base station and the terminal for determining the transmission and reception timing of a second signal and performing the following operation is presented, and the transmitter, the receiver, and the processor of the base station or the terminal should operate according to the respective embodiments.

FIG. 20 is a block diagram illustrating the internal structure of a terminal according to an embodiment of the disclosure.

As illustrated in FIG. 20, a terminal according to the disclosure may include a terminal receiver 2000, a terminal transmitter 2004, and a terminal processor 2002. In an embodiment of the disclosure, the terminal receiver 2000 and the terminal transmitter 2004 may be commonly called a transceiver. The transceiver may transmit/receive a signal with a base station. The signal may include control information and data. For this, the transceiver may be composed of an RF transmitter for up-converting and amplifying the frequency of a transmitted signal, and an RF receiver for low-noise-amplifying and down-converting the frequency of a received signal. Further, the transceiver may receive a signal through a radio channel, and may output the received signal to the terminal processor 2002. The transceiver may also transmit the signal that is output from the terminal processor 2002 through the radio channel. The terminal processor 2002 may operate a series of processes so as to operate according to the above-described embodiments. For example, the terminal receiver 2000 may operate to receive a signal that includes TTI length information for first type transmission from the base station, and the terminal processor 2002 may operate to analyze the TTI length for the first type transmission. Thereafter, the terminal transmitter 2004 may perform transmission and reception of a first type signal using the TTI length.

FIG. 21 is a block diagram illustrating the internal structure of a base station according to an embodiment of the disclosure.

Referring to FIG. 21, a base station according to embodiments of the disclosure may include at least one of a base station receiver 2101, a base station transmitter 2105, and a base station processor 2103. In an embodiment of the disclosure, the base station receiver 2101 and the base station transmitter 2105 may be commonly called a transceiver. The transceiver may transmit/receive a signal with a terminal. The signal may include control information and data. For this, the transceiver may be composed of an RF transmitter for up-converting and amplifying the frequency of a transmitted signal, and an RF receiver for low-noise-amplifying and down-converting the frequency of a received signal. Further, the transceiver may receive a signal through a radio channel, and may output the received signal to the base station processor 2103. The transceiver may also transmit the signal that is output from the base station processor 2103 through the radio channel. The base station processor 2103 may operate a series of processes so as to operate according to the above-described embodiments. For example, the base station processor 2103 may operate to determine a TTI length for first type transmission, and may operate to generate TTI length information for the first type transmission transferred to the terminal. Thereafter, the base station transmitter 2105 transmits the first type signal, and the base station receiver 2101 receives the first type signal to match the TTI length.

Further, according to an embodiment of the disclosure, the base station processor 2103 may operate to generate downlink control information (DCI) that includes the TTI length information for the first type transmission or a higher layer signaling signal. In this case, the DCI may indicate what TTI length the scheduled signal has for the first type transmission.

On the other hand, the embodiments of the disclosure that are described in the specification and drawings are merely for easy explanation of the technical contents of the disclosure and proposal of specific examples to help understanding of the disclosure, but are not intended to limit the scope of the disclosure. That is, it will be apparent to those of ordinary skill in the art to which the disclosure pertains that other modified examples that are based on the technical idea of the disclosure can be embodied. Further, according to circumstances, the respective embodiments may be operated in combination. For example, parts of the second, fourth, and fifth embodiments of the disclosure may be combined with each other to operate the base station and the terminal. Further, although the above-described embodiments have been proposed on the basis of an LTE system, other modified examples based on the technical idea of the above-described embodiments may be embodied in other systems, such as a 5G or NR system.

The invention claimed is:

1. A method performed by a terminal in a communication system, the method comprising:
   receiving configuration information including a length of a first transmission time interval (TTI) for downlink and a length of a second TTI for uplink;
   identifying whether first downlink control information (DCI) for scheduling data on a third TTI is detected;
   in case that the first DCI is not detected, identifying second DCI for scheduling data on the first TTI;
   receiving the data on the first TTI based on the second DCI; and
   transmitting hybrid automatic repeat request (HARQ) acknowledge (ACK) information for the received data on the second TTI,
   wherein the HARQ ACK information is multiplexed based on the configuration information.

2. The method of claim 1, wherein the HARQ ACK information for data received on 3 first TTIs are multiplexed based on the length of the second TTI being slot and the length of the first TTI being subslot.

3. The method of claim 2, wherein the slot includes 7 orthogonal frequency division multiplexing (OFDM) symbols and the subslot includes less than 7 OFDM symbols, and
   wherein the configuration information is received on a radio resource control (RRC) signaling.

4. The method of claim 1, further comprising:
   in case that the first DCI is detected, receiving data on the third TTI and skipping identifying the second DCI,
   wherein the third TTI is a subframe including 14 orthogonal frequency division multiplexing (OFDM) symbols.

5. A method performed by a base station in a communication system, the method comprising:
   transmitting configuration information including a length of a first transmission time interval (TTI) for downlink and a length of a second TTI for uplink;

in case that first downlink control information (DCI) for scheduling data on a third TTI is not transmitted from the base station, transmitting second DCI for scheduling data on the first TTI;

transmitting the data on the first TTI based on the second DCI; and receiving hybrid automatic repeat request (HARQ) acknowledge (ACK) information for the transmitted data on the second TTI, wherein the HARQ ACK information is multiplexed based on the configuration information.

6. The method of claim 5, wherein the HARQ ACK information for data received on 3 first TTIs are multiplexed based on the length of the second TTI being slot and the length of the first TTI being subslot.

7. The method of claim 6, wherein the slot includes 7 orthogonal frequency division multiplexing (OFDM) symbols and the subslot includes less than 7 OFDM symbols, and wherein the configuration information is transmitted on a radio resource control (RRC) signaling.

8. The method of claim 5, futher comprising:

in case that the first DCI is transmitted from the base station, transmitting data on the third TTI based on the first DCI and skipping transmitting the second DCI, wherein the third TTI is a subframe including 14 orthogonal frequency division multiplexing (OFDM) symbols.

9. A terminal in a communication system, the terminal comprising:

a transceiver; and a controller couple with the transceiver and configured to:

receive configuration information including a length of a first transmission time interval (TTI) for downlink and a length of a second TTI for uplink, identify whether first downlink control information (DCI) for scheduling data on a third TTI is detected, in case that the first DCI is not detected, identify second DCI for scheduling data on the first TTI, receive the data on the first TTI based on the second DCI, and transmit hybrid automatic repeat request (HARQ) acknowledge (ACK) information for the received data on the second TTI, wherein the HARQ ACK information is multiplexed based on the configuration information.

10. The terminal of claim 9, wherein the HARQ ACK information for data received on 3 first TTIs are multiplexed based on the length of the second TTI being slot and the length of the first TTI being subslot.

11. The terminal of claim 10, wherein the slot includes 7 orthogonal frequency division multiplexing (OFDM) symbols and the subslot includes less than 7 OFDM symbols, and wherein the configuration information is received on a radio resource control (RRC) signaling.

12. The terminal of claim 9, wherein the controller is further configured to:

in case that the first DCI is detected, receive data on the third TTI and skip identifying the second DCI, wherein the third TTI is a subframe including 14 orthogonal frequency division multiplexing (OFDM) symbols.

13. A base station in a communication system, the base station comprising:

a transceiver; and a controller coupled with the transceiver and configured to:

transmit configuration information including a length of a first transmission time interval (TTI) for downlink and a length of a second TTI for uplink, in case the first downlink control information (DCI) for scheduling data on a third TTI is not transmitted from the base station, transmit second DCI for scheduling data on the first TTI, transmit the data on the first TTI based on the second DCI, and receive hybrid automatic repeat request (HARQ) acknowledge (ACK) information for the transmitted data on the second TTI, wherein the HARQ ACK information is multiplexed based on the configuration information.

14. The base station of claim 13, wherein the HARQ ACK information for data received on 3 first TTIs are multiplexed based on the length of the second TTI being slot and the length of the first TTI being subslot.

15. The base station of claim 14, wherein the slot includes 7 orthogonal frequency division multiplexing (OFDM) symbols and the subslot includes less than 7 OFDM symbols, and wherein the configuration information is transmitted on a radio resource control (RRC) signaling.

16. The base station of claim 13, wherein the controller is further configured to:

in case that the first DCI is transmitted from the base station, transmit data on the third TTI based on the first DCI and skip transmitting the second DCI, wherein the third TTI is a subframe including 14 orthogonal frequency division multiplexing (OFDM) symbols.

* * * * *